US012445909B2

(12) United States Patent
Alvarado et al.

(10) Patent No.: US 12,445,909 B2
(45) Date of Patent: *Oct. 14, 2025

(54) GATEWAY MANAGEMENT

(71) Applicant: Comcast Cable Communications, LLC, Philadelphia, PA (US)

(72) Inventors: Leslie Alvarado, Philadelphia, PA (US); Teddy El-Rashidy, Philadelphia, PA (US); Alberto Garcia-Ortiz, Saint Davids, PA (US); Colleen Szymanik, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,428

(22) Filed: Jun. 17, 2024

(65) Prior Publication Data

US 2024/0406802 A1    Dec. 5, 2024

Related U.S. Application Data

(63) Continuation of application No. 17/834,531, filed on Jun. 7, 2022, now Pat. No. 12,052,608.

(51) Int. Cl.
*H04W 4/00* (2018.01)
*H04W 28/02* (2009.01)
*H04W 28/086* (2023.01)
*H04W 28/20* (2009.01)
*H04W 88/16* (2009.01)

(52) U.S. Cl.
CPC ....... *H04W 28/20* (2013.01); *H04W 28/0236* (2013.01); *H04W 28/086* (2023.05); *H04W 88/16* (2013.01)

(58) Field of Classification Search
CPC ............... H04W 28/20; H04W 28/086; H04W 28/0236; H04W 88/16
See application file for complete search history.

(56) References Cited

U.S. PATENT DOCUMENTS

| | | | |
|---|---|---|---|
| 8,588,184 B2 | 11/2013 | Doherty et al. | |
| 9,445,270 B1 * | 9/2016 | Bicket | H04L 12/66 |
| 9,948,503 B2 | 4/2018 | Vedula | |
| 10,616,939 B2 | 4/2020 | Bostick et al. | |
| 10,972,895 B2 * | 4/2021 | Abouelseoud | H04W 40/246 |
| 11,984,974 B2 * | 5/2024 | Deng | H04W 68/005 |
| 12,052,608 B2 * | 7/2024 | Alvarado | H04W 28/20 |

(Continued)

FOREIGN PATENT DOCUMENTS

| | | | |
|---|---|---|---|
| CN | 101909067 A | * | 12/2010 |
| CN | 102710804 A | * | 10/2012 |

(Continued)

*Primary Examiner* — Abdelnabi O Musa
(74) *Attorney, Agent, or Firm* — Banner & Witcoff, Ltd.

(57) ABSTRACT

Systems, apparatuses, and methods are described for associating a gateway device as a backup for another gateway device based on the communication characteristics of the gateways. The communication characteristics of the gateways may indicate that the gateways available are suitable backups of each other in the event that one of the gateways becomes inoperable or has an excessive workload. The associations between the gateways may be further based on the network channels used by the gateways for communications.

45 Claims, 15 Drawing Sheets

(56) References Cited

U.S. PATENT DOCUMENTS

| | | |
|---|---|---|
| 2003/0087629 A1 | 5/2003 | Juitt et al. |
| 2006/0179472 A1 | 8/2006 | Chang et al. |
| 2008/0080365 A1 | 4/2008 | Weeresinghe |
| 2012/0027008 A1* | 2/2012 | Chou ................ H04L 65/1046 370/352 |
| 2012/0324567 A1* | 12/2012 | Couto ................ H04L 41/0853 709/224 |
| 2014/0157042 A1 | 6/2014 | Johnson et al. |
| 2014/0310416 A1* | 10/2014 | Durbha ................ H04L 63/08 709/225 |
| 2017/0163608 A1* | 6/2017 | Bicket .................... H04W 4/38 |
| 2018/0067995 A1* | 3/2018 | Ishii ...................... H04L 43/106 |
| 2018/0139796 A1 | 5/2018 | Beijar et al. |
| 2019/0373081 A1* | 12/2019 | Jung .................... H04L 67/125 |
| 2020/0204975 A1* | 6/2020 | Abouelseoud ........ H04W 16/28 |
| 2021/0409243 A1 | 12/2021 | Yang et al. |
| 2025/0055785 A1* | 2/2025 | Stubbs .................... H04L 45/02 |

FOREIGN PATENT DOCUMENTS

| | | | | |
|---|---|---|---|---|
| CN | 102223365 B | * | 2/2014 | |
| CN | 105208629 A | | 12/2015 | |
| CN | 105450540 A | * | 3/2016 | |
| CN | 107483234 A | * | 12/2017 | ......... H04L 41/0668 |
| CN | 108234394 A | * | 6/2018 | |
| CN | 109788500 A | * | 5/2019 | |
| CN | 107517477 B | | 1/2021 | |
| CN | 113794541 A | | 12/2021 | |
| CN | 113285874 B | * | 3/2022 | ............. H04L 45/54 |
| CN | 114902620 A | | 8/2022 | |
| CN | 114938529 B | * | 11/2022 | |
| CN | 114629747 B | * | 2/2024 | ......... H04L 12/2803 |
| WO | WO-2004082222 A1 | * | 9/2004 | ............. H04L 47/10 |
| WO | 2018019058 A1 | | 2/2018 | |
| WO | WO-2019033475 A1 | * | 2/2019 | ............. H04L 67/12 |

\* cited by examiner

DATA COLLECTED BY SCANNING NETWORK CHANNELS ALPHA AND BETA

| NETWORK CHANNEL | GATEWAY | ASSOCIATED WIRELESS ACCESS POINTS | GATEWAYS DETECTED | NETWORK SERVICE PROVIDER |
|---|---|---|---|---|
| ALPHA | A | AP1; AP2; AP3; AP4 | B, D, E, F, J, H | I |
| ALPHA | B | AP5; AP6; AP7 | A, C, D, I | I |
| ALPHA | C | AP8; AP9 | B, G, E | I |
| ALPHA | D | AP10; AP11; AP12; AP13 | E | I |
| ALPHA | E | AP14 | A, C | I |
| ALPHA | F | AP15; AP16; AP17; AP18 | A | I |
| ALPHA | G | AP19; AP20; AP21 | C, H | I |
| ALPHA | H | AP22; AP23 | A, D, G, I | II |
| ALPHA | I | AP24; AP25; AP26 | D, F, J | II |
| ALPHA | J | AP27; AP28; AP29; AP30 | A, B, G, K, L | II |
| ALPHA | K | AP31; AP32; AP33 | B, D, H, J | II |
| ALPHA | L | AP34; AP35; AP36 | A, F, J | II |
| BETA | M | AP37; AP38; AP39 | O, P, T | II |
| BETA | N | AP40; AP41 | Q, R, S | II |
| BETA | O | AP42; AP43 | S, T | II |
| BETA | P | AP44; AP45; AP46; AP47 | O, Q, R, S, T | II |
| BETA | Q | AP48 | R, S, T | I |
| BETA | R | AP49; AP50 | M, N, P | I |
| BETA | S | AP51; AP52; AP53; AP54 | M, R, T | I |
| BETA | T | AP55; AP56; AP57 | N, O, P, S | I |

TABLE INDICATING GATEWAYS USING NETWORK CHANNEL ALPHA OVER A PERIOD OF 24 HOURS

| CHANNEL | GATEWAY | ACCESS POINT | SERVICE PROVIDER | DETECTED GATEWAYS (NUMBER OF TIMES DETECTED DURING A TIME PERIOD) |
|---|---|---|---|---|
| ALPHA | A | AP1; AP2; AP3; AP4 | I | B(3), D(8), E(6), F(11), J(5), H(8) |
| ALPHA | B | AP5; AP6; AP7 | I | A(10), C(9), D(8), L(5) |
| ALPHA | C | AP8; AP9 | I | B(9),G(11),E(8) |
| ALPHA | D | AP10; AP11; AP12; AP13 | I | E(4) |
| ALPHA | E | AP14 | I | A(8), C(3), K(10) |
| ALPHA | F | AP15; AP16; AP17; AP18 | I | A(9) |
| ALPHA | G | AP19; AP20; AP21 | I | C(9), H(10) |
| ALPHA | H | AP22; AP23 | II | A(10), F(6), J(8) |
| ALPHA | I | AP24; AP25; AP26 | I | H(7), C(3) |
| ALPHA | J | AP27; AP28; AP29; AP30 | II | A(6),B(8),G(7) |
| ALPHA | K | AP31; AP32; AP33 | II | E(10) |
| ALPHA | L | AP34; AP35; AP36 | II | A(7), F(3) |

FIG. 6A

SET OF GATEWAYS DETECTED WITHIN LAST 24 HOURS, USING NETWORK CHANNEL ALPHA, AND ASSOCIATED WITH SERVICE PROVIDER I ─ 620

| CHANNEL | GATEWAY ID | ACCESS POINT ID | SERVICE PROVIDER | NEIGHBORING GATEWAYS DETECTED (NUMBER OF TIMES DETECTED IN THE LAST 24 HOURS) |
|---|---|---|---|---|
| ALPHA | A | AP1; AP2; AP3; AP4 | I | B(3), D(8), E(6), F(11), J(5) |
| ALPHA | B | AP5; AP6; AP7 | I | A(10), C(9), D(8) |
| ALPHA | C | AP8; AP9 | I | B(9), G(11), E(8) |
| ALPHA | D | AP10; AP11; AP12; AP13 | I | E(4) |
| ALPHA | E | AP14 | I | A(8), C(3) |
| ALPHA | F | AP15; AP16; AP17; AP18 | I | A(9) |
| ALPHA | G | AP19; AP20; AP21 | I | C(9), H(10) |
| ALPHA | J | AP27; AP28; AP29; AP30 | I | A(6), B(8), G(7) |

FIG. 6B

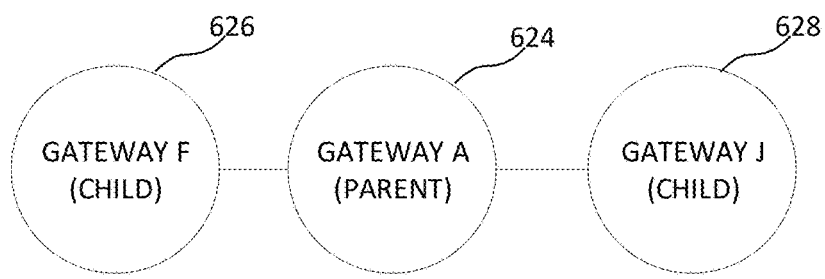

FIG. 6C

SUBSET OF GATEWAYS AFTER FORMING SECOND CLUSTER — 640

| CHANNEL | GATEWAY ID | SERVICE PROVIDER | NEIGHBORING GATEWAYS DETECTED (NUMBER OF TIMES DETECTED IN THE LAST 24 HOURS) |
|---|---|---|---|
| ALPHA | D | I | |

THIRD GATEWAY CLUSTER — 642

GATEWAY MANAGEMENT

CROSS-REFERENCE TO RELATED APPLICATIONS

This application is a continuation of and claims priority to U.S. patent application Ser. No. 17/834,531, filed Jun. 7, 2022, which is hereby incorporated by reference.

BACKGROUND

Gateways may be used to provide data connectivity service to a variety of user devices. However, if a gateway becomes incapacitated or overloaded, then the data connectivity service to the user devices may suffer.

SUMMARY

The following summary presents a simplified summary of certain features. The summary is not an extensive overview and is not intended to identify key or critical elements.

As described herein, an association between gateways may be formed (e.g., by clustering gateways) based on how well they can wirelessly communicate with one another. If a gateway becomes inoperable or has excess workload, some of the affected gateway's workload may be reassigned to another gateway associated with the affected gateway. Information may be collected from a gateway to indicate wireless signal characteristics of the gateway's environment. For example, the gateway may report the wireless frequencies that it (or a wireless access point (WAP) associated with the gateway) is sending and/or receiving; other wireless devices (including other gateways) whose signals it can receive; signal strengths; wireless noise; the communication protocols being used, etc. Wireless signal characteristics from multiple gateways that are near one another, as well as from other wireless devices in the environment, may be gathered and this information may be used to form associations between gateways so that the gateways that are associated with each other are suitable backups for one another. A gateway may be most suitable as a backup if the gateway can wirelessly communicate well with the gateway it is backing up (e.g., strong signal strength from the other gateway, uses compatible protocols as the other gateway, supports similar networks, etc.). Associations between the gateways may be further based on other characteristics, such as physical locations, bandwidth requirements, and/or network failure rates of the gateways.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5 illustrates example data collected by scanning a wireless environment of gateways.

FIGS. 6A-G illustrate example groups of gateways based on data collected by monitoring wireless activities of the gateways and WAPs connected to the gateways.

DETAILED DESCRIPTION

Figure 1:
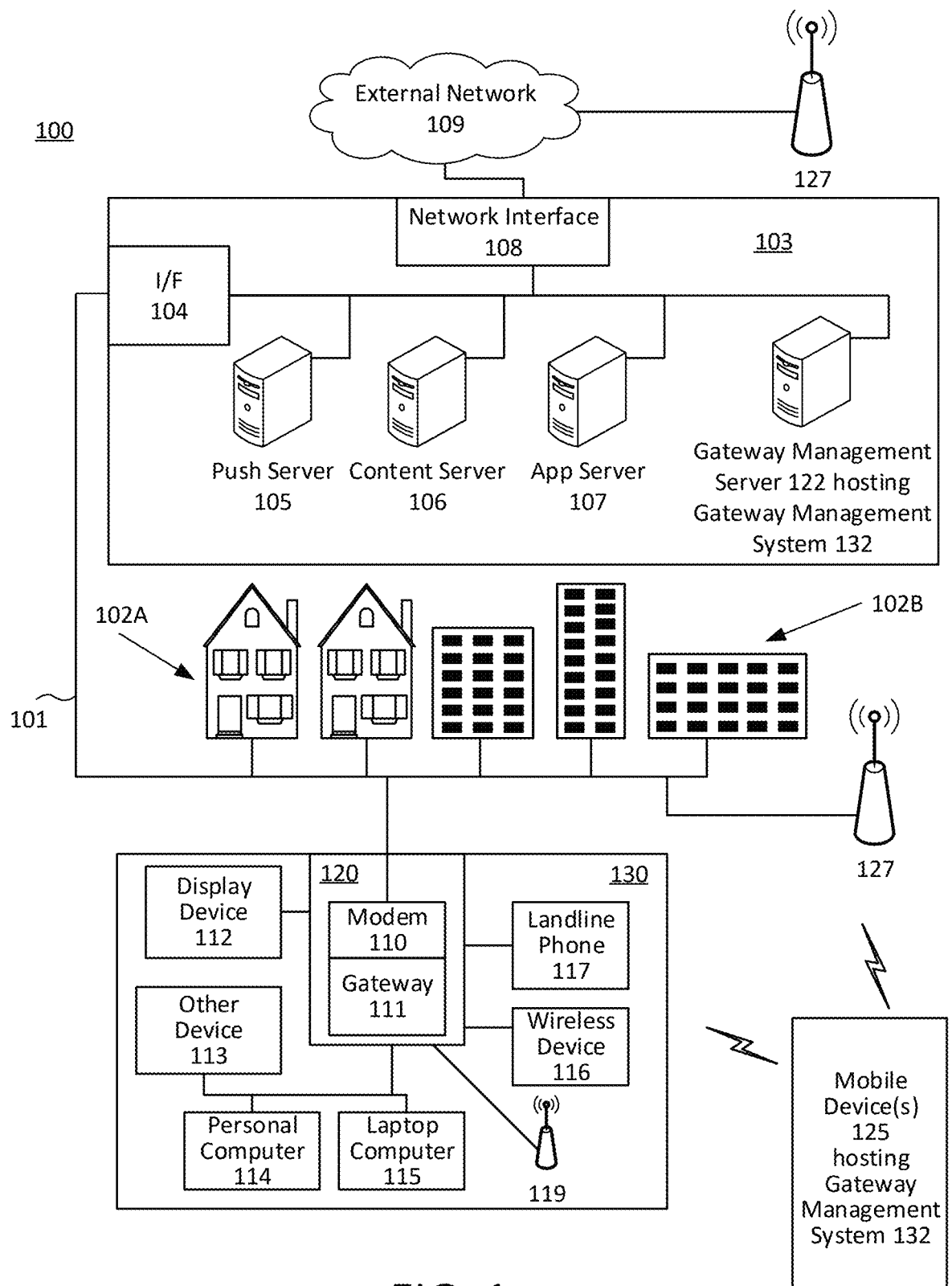
FIG. 1 shows an example communication network in which the features described herein may be implemented.

The accompanying drawings show examples of various features described herein. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect various premises 102A, 102B (e.g., businesses, homes, consumer dwellings, train stations, airports, etc.) to a local office 103 (e.g., a headend). The local office 103 may send downstream information signals and receive upstream information signals via the communication links 101. Each of the premises 102A and 102B may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smartphones, tablets, or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS), or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102A, 102B, and/or to the mobile devices 125. The content server 106 may be configured to provide content to devices in the premises 102A, 102B and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as the gateway management server 122 (described below), additional push, content, and/or application servers, and/or other types of servers. Although shown separately, the push server 105, the content server 106, the application server 107, the gateway management server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

The various premises in FIG. 1 may include single-dwelling premises 102A (e.g., single-family homes, small businesses, etc.) and/or multi-dwelling premises 102B (e.g., commercial buildings, business and/or university campuses, residential duplexes, apartment buildings, condominiums, or similar types of multiple dwelling unit arrangements on one parcel of land or neighborhood). The single-dwelling premises 102A may comprise one interface 120 (e.g., all devices in a single dwelling premise may communicate via only one interface). Multiple-dwelling premises 102B may comprise multiple interfaces 120. For example, individual dwellings in multi-dwelling premises 102B (e.g., individual apartments or floors in a large apartment building, individual offices in commercial buildings, individual rooms or buildings on university campuses, individual homes in residential duplexes, etc.) may each comprise one interface 120. Alternatively, individual dwellings in the multi-dwelling premises 102B floors may comprise multiple interfaces 120 and/or multiple dwellings may share one interface (e.g., a single interface may cater to multiple dwellings located in each floor of a multi-story building). Dwelling 130 shows details of an example dwelling, such as a single-dwelling premise (e.g., a single-family home) or an individual dwelling (e.g., an apartment, a business, etc.) or floor of a multi-dwelling premise.

The interface 120 of the example dwelling 130 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. The interface 120 may comprise a gateway 111. The modem 110 may be connected to, or be a part of, the gateway 111.

The gateway 111 may be a computing device that communicates with the modem(s) 110 to allow one or more user devices in the example dwelling 130 to communicate with other user devices in the example dwelling 130, the local office 103 and/or with other devices beyond the local office 103 (e.g., via the local office 103 and the external network(s) 109). The gateway 111 may enable data flow between two networks operating with different transmission protocols. The gateway 111 may comprise a digital transport adapter (DTA), a router, a computer server, and/or any other desired computing device. The gateway 111 may also be connected to one or more wireless access points (e.g., the wireless access point 119) in the example dwelling 130 to establish one or more wireless networks in the example dwelling 130 that enable user devices in the example dwelling 130 to wirelessly communicate with other user devices in the example dwelling 130, the local office 103 and/or with other devices beyond the local office 103 (e.g., via the local office 103 and the external network(s) 109). One gateway and one wireless access point is shown in FIG. 1, but a plurality of gateways and/or wireless access points operating in parallel may be implemented within the interface 120.

User devices in the example dwelling 130 may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol VoIP phones), and/or any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the example dwelling 130 may represent wired or wireless connections, as may be appropriate for the type of local network used. One or more of the devices at the example dwelling 130 may be configured to provide wireless communications channels (e.g., IEEE 802.11 channels) to communicate with one or more of the mobile devices 125, which may be on- or off-premises. The mobile devices 125, one or more of the devices in the example dwelling 130, and/or other devices may receive, store, output, and/or otherwise use assets. An asset may comprise a video, a game, one or more images, software, audio, text, webpage(s), and/or other content.

The gateway 111, the wireless access point 119, and/or the devices in the example dwelling 130 may be configured to transmit and receive wireless signals (e.g., RF signals) over a particular frequency band. Such frequency bands may be defined by one or more communication protocols or standards such as the Institute of Electrical and Electronics Engineers (IEEE) 802.xx (e.g., 802.11, 802.15, 802.16, etc.). Example frequency bands comprise, among others, 2.4 GHz band, 5 GHz band, and 60 GHz band. Each of the frequency bands may be sub-divided into one or more network channels. For example, fourteen network channels may be designated by the IEEE 802.11b/g/n/ax standard for the 2.4 GHz frequency band, where the network channels are spaced 5 MHz apart except for the last two network channels being 12 MHz apart. The network channels designated by the IEEE standard for the 2.4 GHz may be 2412 MHz (designated as channel "1"), 2417 MHz (designated as channel "2"), 2422 MHz (designated as channel "3"), 2427 MHz (designated as channel "4"), 2432 MHz (designated as channel "5"), 2437 MHz (designated as channel "6"), 2442 MHz (designated as channel "7"), 2447 MHz (designated as channel "8"), 2452 MHz (designated as channel "9"), 2457 MHz (designated as channel "10"), 2462 MHz (designated as channel "11"), 2467 MHz (designated as channel "12"), 2472 MHz (designated as channel "13"), and 2484 MHz (designated as channel "14"). As such, gateways 111, the wireless access point 119, and/or the user devices 112-117 in the example dwelling 130 may be configured to transmit and receive wireless signals over a select one or more of the network channels of a particular frequency band.

If a gateway, in the multi-dwelling premises 102B or a neighborhood comprising single-dwellings premises 102A and/or multi-dwellings 102B, becomes inoperable or experiences a problem, data communications of user devices being serviced by the affected gateway may suffer. Therefore, one or more backup gateways of the affected gateway may be identified such that the backup gateways may assist the user devices originally being serviced by the affected gateway, and data communications of the devices can continue via one of the backup gateways. Gateways that can serve as backups of each other may be grouped (e.g., clustered) to form an association between the gateways. Forming such associations may comprise storing, at each gateway of the group and any wireless access points connected to the gateway, information (e.g., Internet Protocol (IP) addresses, media access control address (MAC) addresses) about one or more other gateways in the group that may serve as backup gateways and/or wireless access points connected to the backup gateways.

Two gateways located close to each other may be considered backups of each other with a presumption that user devices serviced by one of the closely located gateways can also be serviced by the other gateway if the originally connected gateway becomes inoperable or experiences problems. However, sometimes the nearest gateway may be an unsuitable candidate for being a backup gateway because the nearest gateway may be configured to transmit and receive wireless signals over a different network channel than the affected gateway, the nearest gateway may be connected to a local office other than the local office 103, and/or there are one or more signal degrading sources (e.g., a wall, a microwave, etc.) located between the two gateways.

The gateway management server 122 may host a gateway management system 132 configured to find backup gateways available at a particular neighborhood and/or multi-dwelling premises based on suitability of the gateways to act as backups in the event another gateway in the cluster becomes inoperable or has excessive workload. The gateway management server 122 may then group gateways that are suitable backups of each other. The gateway management system 132 disclosed herein may alternatively be hosted by one or more mobile devices 125, any of the devices shown in the premises 102A, 102B, 130, any of the devices shown in the local office 103, any devices with the external network 109, and/or other devices. The functions of the gateway management system 132 may be performed by software, hardware, or a combination of software and hardware. Additional details of the gateway management system 132 will be discussed further below.

Figure 2:
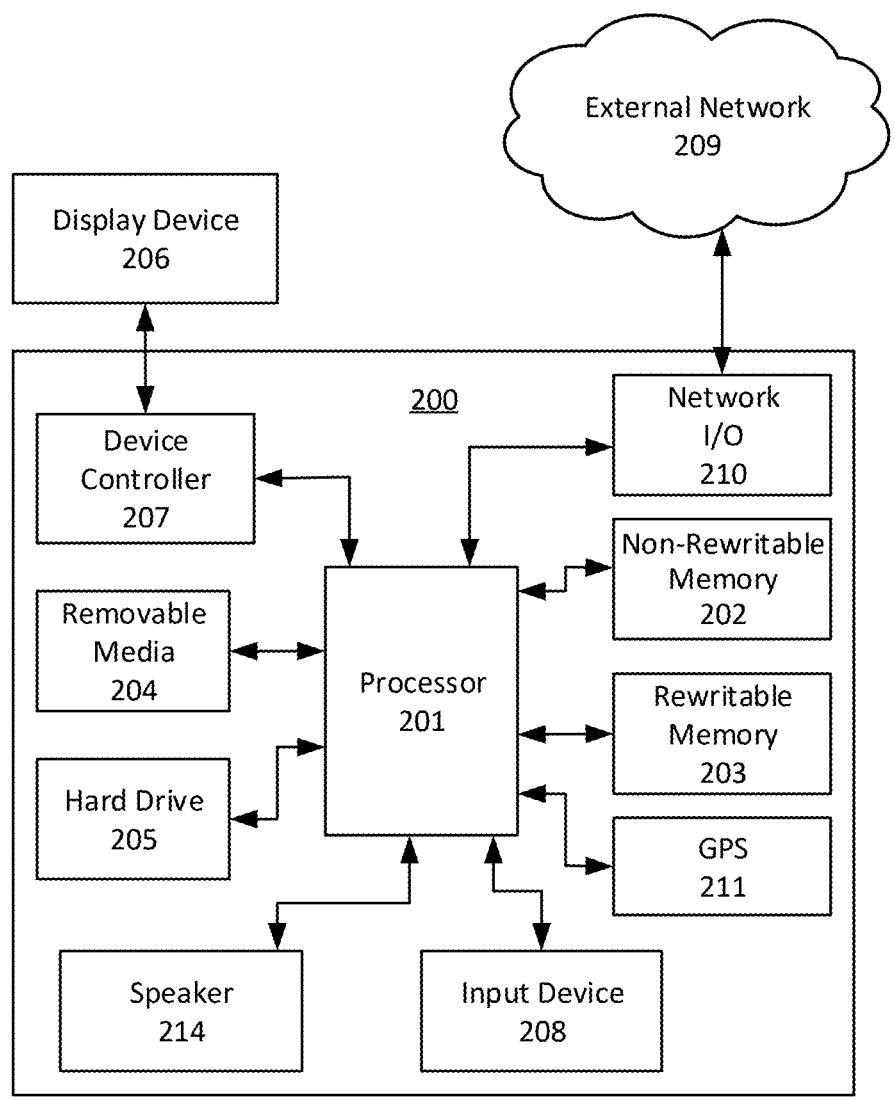
FIG. 2 shows hardware elements of an example computing device that may be used to implement any of the elements and features described herein.
Figure 3:
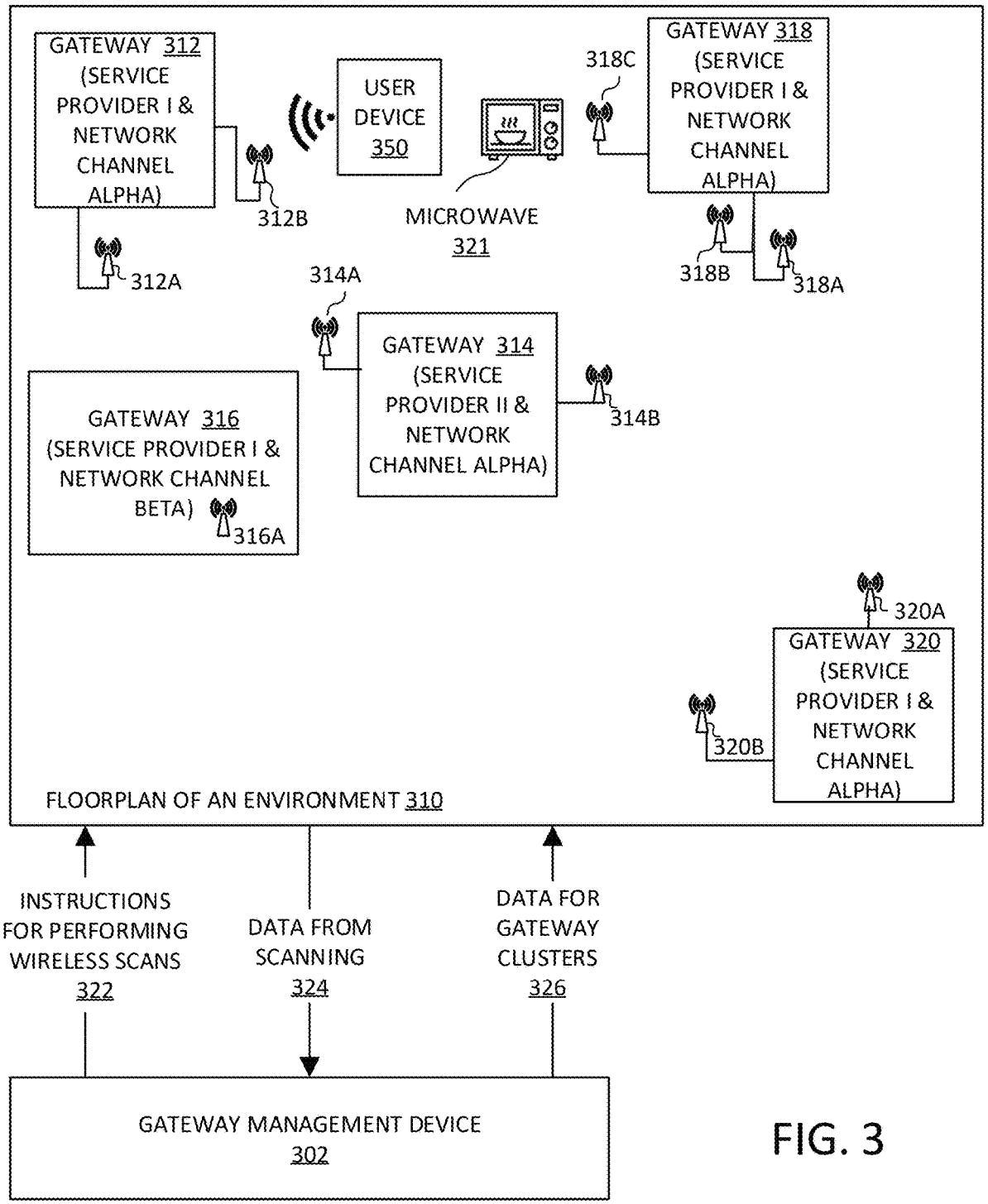
FIG. 3 illustrates an example environment in which a gateway management system of the present disclosure may be used.

FIG. 2 shows hardware elements of a computing device 200 that may be used to implement any of the computing devices shown in FIG. 1 (e.g., the gateway 111, the mobile devices 125, any of the devices shown in the premises 102A, 102B, 130, any of the devices shown in the local office 103, any of the wireless access points 119, 127, any devices with the external network 109) and any other computing devices discussed herein (e.g., one or more computing device hosting the gateway management system 302 and/or any devices in FIG. 3, one or more computing device performing the process in FIG. 4A-F or FIG. 8). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random-access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The network I/O interface 210 may be configured to operate according to any wireless data communication standards, such as IEEE 802.11 wireless local area network (WLAN) standards, IEEE 802.15 wireless personal area network (WPAN) standards, wireless wide area network (WWAN) standards such as 3GPP or 3GPP2, or similar wireless standards. The network I/O interface 210 may be configured to connect to any combination of cellular wireless connections, including 2G, 2.5G, 3G, 4G, 5G, etc. The computing device 200 may be configured to estimate its location through BLUETOOTH signal triangulation, beacons (e.g., iBEACON and SENION beacons), communications with one or more GPS satellites, proximity to one or more wireless sources, multilateration or triangulation of radio signals between several nearby cell towers, IP addresses of the computing device 200, and so on.

The computing device 200 may comprise transmitter/receiver circuitry, wireless controller circuitry, and/or other circuitry that may be capable of scanning among a plurality of network channels in one or more wireless frequency bands (e.g., radio frequency bands) to detect other devices using the network channels for communications in the wireless range of the computing device 200. The computing device 200 may be configured to monitor and measure wireless signal characteristics (e.g., RF characteristics) of itself and/or the detected devices by receiving wireless signals (e.g., RF signals) either transmitted from, reflected by, or manipulated by itself and/or the detected devices and/or sending wireless signals (e.g., RF signals) to the detected devices. The computing device 200 may measure various metrics relating to wireless communication of itself and/or the detected devices, such as the workload, received signal strength levels, bit error rates, signal to noise ratios, latencies, jitter, and other metrics relating to signal quality and strength of the devices. Various software modules comprising the instructions for monitoring and measuring the wireless signal characteristics may be coordinated by an operating system (OS) of the computing device 200 and/or via an application programming interface (API). An example operating system may include WINDOWS, ANDROID, and other OS types. Example APIs may include WIN 32, WIN 64, CORE JAVA API, or ANDROID APIs. The computing device 200 may be configured to broadcast reports from monitoring and measuring wireless signal characteristics (e.g., RF characteristics) to other computing devices wirelessly or via a wired connection. The computing device 200 may also be configured to store the measured wireless characteristics in memory (e.g., the non-rewritable memory 202, the rewritable memory 203, the removable media 204, and/or the hard drive 205).

Although FIG. 2 shows an example hardware configuration, one or more of the elements of the computing device 200 may be implemented as software or a combination of hardware and software. Modifications may be made to add, remove, combine, and/or divide components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations, and other operations described herein. An IC may perform some operations based on the execution of programming instructions read from ROM or RAM, with other operations hardwired into gates or other logic. Further, an IC may be configured to output image data to a display buffer.

FIG. 3 illustrates a floorplan of an example environment 310 inside a premise (e.g., any one of the premises 102A, 102B, or the example dwelling 130) comprising multiple gateways 111 (e.g., gateways 312, 314, 316, 318, 320). While FIG. 3 shows the example environment 310 to include only one floor of a premise, the example environment 310 may comprise multiple floors of a building, multiple buildings, a neighborhood, and/or one or more geographic areas. Similarly, while FIG. 3 shows only five gateways, any number of gateways may be similarly present.

The gateways 312, 314, 316, 318, 320 may allow data communications between devices (e.g., user devices such as the user device 350, computers, smartphones, laptops, tablets, set-top boxes, display devices, or other devices) in the environment 310 via one or more local networks present in the environment 310 (e.g., Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), local area networks (LANs), wireless local area networks (WLANs), wireless personal area networks (WPANs), low power wireless area networks (LPWAN), networks communicating via in-premises power lines, wireless wide area networks (WWAN), and/or others). The gateways 312, 314, 316, 318, 320 may also facilitate data communications between devices in the environment 310 and other devices outside the environment 310 (e.g., via lines 101, or wide area networks, Internet, macro-cellular networks comprising 5G standards Long-Term Evolution (LTE), LTE advanced, LTE—License Assisted Access (LAA) networks, Worldwide Interoperability for Microwave Access (WiMAX), etc.). Because the network protocols for the different networks may differ, the gateways 312, 314, 316, 318, 320 may provide interoperability between the networks by converting information, data, or other communications from one protocol or format to another. The gateways 312, 314, 316, 318, 320 in the environment 310 may comprise a heterogeneous mix of equipment from various manufacturers, using various interface standards, having various network and/or wireless characteristics, and exhibiting varying degrees of interoperability. Each of the gateways 312, 314, 316, 318, 320 may be identified by a unique identifier, such as a media access control address (MAC address), an IP address, serial number, latitude/longitude, geo-encoding, an assigned unique identifier, global unique identifier (GUID), identifier associated with the manufacturer or service provider, a model or type of gateway, etc.

The gateways 312, 314, 316, 318, 320 in the environment 310 may connect devices (e.g., the user device 350, or computers, smartphones, laptops, tablets, set-top boxes, display devices, or other devices) in the environment 310 to networks provided by different network service providers (e.g., XFINITY, AT&T, VERIZON, CENTURYLINK, COX, etc.). For example, the gateways 312, 316, 318, 320 may connect devices in the environment 310 to a network provided by the service provider I, while the gateway 314 may connect the devices to another network provided by the service provider II. Different network service providers (e.g., network service providers I and II) may have different network communication protocols. While FIG. 3 includes gateways associated with only two network service providers, any number of network service providers may cater to the network communication needs of the environment 310 by deploying any number of gateways.

The gateways (e.g., the gateway 316) may comprise an internal (e.g., in-built) wireless access point (WAP) (e.g., internal WAP 316A) such that the devices (e.g., user devices 350 or any other computers, smartphones, laptops, tablets, set-top boxes, display devices, or other devices) in the environment 310 can connect wirelessly to the gateways. Additionally, or alternatively, one or more external wireless access points (WAPs) (e.g., WAPs 312A-B, 314A-B, 318A-C, 320A-B) may be communicatively coupled to the gateways. Gateways with internal WAPs (e.g., gateway 316) and external WAPs (e.g., WAPs 312A-B, 314A-B, 318A-C, 320A-B) may offer wireless networks that may be used by nearby devices (e.g., user devices 350 or any other computers, smartphones, laptops, tablets, set-top boxes, display devices, or other devices) in the environment 310. The WAPs may be connected to the gateways via one or more wired connections. The WAPs (e.g., WAPs 312A-B, 314A-B, 316A, 318A-C, 320A-B) may wirelessly connect the devices to the gateways (e.g., 312, 314, 316, 318, 320) such that the devices may access networks present inside and/or outside the environment 310. The devices connecting to the WAPs (e.g., WAPs 312A-B, 314A-B, 316A, 318A-C, 320A-B) in the environment 310 may be wireless and/or BLUETOOTH enabled devices that connect to the WAPs using one or more wireless standards, such as Wi-Fi, BLUETOOTH, and/or similar standards. Each of the WAPs (e.g., WAPs 312A-B, 314A-B, 316A, 318A-C, 320A-B) may be connected to or serviced by one of the gateways (e.g., 312, 314, 316, 318, 320) in the environment 310 such that the gateway communicatively connects the WAP to the various networks present inside and/or outside the environment 310. For example, WAPs 312A, 312B may be connected to the gateway 312, WAPs 314A, 314B may be connected to the gateway 314, WAPs 318A, 318B, 318C may be connected to the gateway 318, and WAPs 320A, 320B may be connected to the gateway 320. The WAPs (e.g., WAPs 312A-B, 314A-B, 318A-C, 320A-B) in the environment 310 may be network devices, routers, switches, communication devices, and/or any similar computing devices. The WAPs (e.g., WAPs 312A-B, 314A-C, 318A-C, 320A-B, 330A) may be identified by one or more unique identifiers, such as basic service set identifiers (BSSID), a media access control address (MAC address), one or more of an IP Address, serial number, latitude/longitude, geo-encoding, custom assigned unique identifier, global unique identifier (GUID), an identifier associated with the manufacturer, a model or type of device, a service provider associated with the WAP, etc.

Each gateway (e.g., the gateways 312, 314, 318, 320) may be configured to communicate via a particular network channel of a particular frequency band (e.g., 2.4 GHz frequency band, 5 GHz frequency band, 60 frequency GHz band, etc.). As a result, different gateways in an environment (e.g., the gateways 312, 314, 318, 330 in the environment 310) may be configured to communicate via different network channels of a single frequency band and/or different network channels of different frequency bands. For example, gateways 312, 314, 318, 320 may be configured to communicate via the channel ALPHA channel, and the gateway 316 may be configured to communicate via the channel BETA, where the channels ALPHA and BETA may be different network channels on a single frequency band (e.g., channels 1 and 10 of the 2.4 GHz frequency band) or different logical channels on different frequency bands (e.g., channel 1 the 2.4 GHz frequency band and channel 40 of the 5 GHz frequency band). In addition, WAPs (internal or external) connected to a gateway may also be configured to communicate via the same network channel as the gateway.

A user device (e.g., the user device 350) may want to wirelessly access networks present inside and/or outside the environment 310 and scan (e.g., listen for wireless signals, such as radio frequency (RF) signals) its surrounding area to discover signals (e.g., beacons) transmitted by any of the WAPs (e.g., WAPs 312A-B, 314A-C, 318A-C, 316A, 320A-B). The signals may comprise a service set identifier (SSID) of the network provided by the WAP or the gateway connected to the WAP, a basic service set identifier (BSSID) for the WAP, a frequency band (e.g., 2.4 GHz, 5 GHz, 60 GHz, and others) and/or a network channel of the network frequency band that the gateway or the WAP is operating on, communication protocols or standards (e.g., 802.11ac, n, a, b, g, etc.), etc. After the user device discovers a signal (e.g., a beacon) from a WAP, it may initiate an association process with the WAP that transmitted the discovered signal to access various networks inside and/or outside the environment 310. For example, the user device 350 may scan its surrounding area and discover signals (e.g., beacons) transmitted by WAP 312B. The user device may then initiate an association process with the WAP 312B and then use the WAP 312B and the gateway 312 connected to the WAP 312B to access various networks inside and/or outside the environment 310.

Each gateway in the environment (e.g., the gateways 312, 314, 316, 318, 320) may have its own workload. The workload of a gateway may comprise the handling of data communications of user devices that are wirelessly connected to WAPs (external or internal) serviced by the gateway. For example, the WAPs 312A and WAP 312B are serviced by the gateway 312, and may facilitate data communications of various devices wirelessly connected to the WAPs 312A, 312B including the user device 350 (e.g., the user device 350 may be wirelessly connected either to WAP 312A or 312B). Therefore, the workload of the gateway 312 may comprise the handling of data communications of all the devices communicating wirelessly via the WAPs 312A, 312B. While FIG. 3 shows only the gateway 312 handing data communications of one user device (e.g., the user device 350) connected to WAP 312B, multiple devices may be present in the environment 310 and be connected wirelessly to the WAPs 312A, 312B.

If a gateway (e.g., the gateway 312) fails to operate adequately, data communications for user devices (e.g., the user device 350) that are wirelessly connected to WAPs (e.g., the WAPs 312A, 312B) serviced by the affected gateway (e.g., the gateway 312) may suffer. For example, if the gateway 312 becomes inoperable or loses power, WAPs 312A, 312B and/or any devices (e.g., the user device 350) wirelessly connected to WAPs 312A, 312B may be disconnected from networks present inside and/or outside the environment 310. Alternately, if the gateway 312 has excess workload, data communications of the user devices may be of low quality of service (QoS) (e.g., high latency, jitters, bit error rate, packet error ratio, frame error rates, and/or other similar characteristics).

If a gateway (e.g., the gateway 312) in the environment 310 becomes inoperable or has excess workload, one or more other gateways in the environment 310 may act as a backup gateway of the affected gateway to provide assistance to the affected gateway. Sometimes, gateways located close to each other may be designated as backup gateways. For example, the gateways 314, 316, and 318 are located close to the gateway 312, and one or more of the gateways 314, 316, and 318 may be designated as the backup gateways of the gateway 312. The affected gateway (e.g., the gateway 312) may store information (e.g., IP address, MAC address, and/or other similar data) about its external or internal WAPs, backup gateways (e.g., the gateways 314, 316, and 318), and/or WAPs connected to the backup gateways (e.g., the WAPs 314A-B, 318A-C). The WAPs (e.g., WAPs 312A, 312B), connected to the affected gateway (e.g., the gateway 312) may also store information (e.g., IP address, MAC address, and/or other similar data) about the backup gateways of the affected gateway (e.g., the gateways 314, 316, and 318), and/or WAPs connected to the backup gateways (e.g., the WAPs 314A-B, 316A, 318A-C). If the affected gateway (e.g., the gateway 312) has excess workload, some of its workload may be reassigned to one of the backup gateways (e.g., gateway 314) by using the information stored by the gateway. For example, if the gateway 312 is overloaded, it can forward some or all of the data communications from WAP 312A to gateway 314 for handling. Additionally, or alternatively, some or all of the WAPs of the affected gateway may disconnect from the affected gateway and then connect to one or more of the backup gateways to continue connecting user devices (e.g., the user device) in the environment 310 to networks inside and/or outside the environment via the backup gateways. Therefore, if the gateway 312 becomes inoperable or has excess workload, the WAP 312B may connect to one of the backup gateways (e.g., the gateways 314, 316, 318). As a result, the user device 350, which was originally using the gateway 312 via the WAP 312B to access networks inside and/or outside the environment, may now access the networks via one of the backup gateways. Alternatively, a user device (e.g., the user device 350), previously being serviced by the affected gateway, may directly connect to one or more of the backup gateways or WAPs connected to the backup gateways.

Gateways may be considered as backup gateways based solely on their location. For example, nearby gateways may be considered as good backup candidates. However, sometimes gateways that are close to one another may be unsuitable to serve as backups of each other, and sometimes a gateway that is actually farther away may be a more suitable backup. For example, the gateway 316 may be the closest to the gateway 312, and the gateway 316 may be designated as the backup of the gateway 312 based on its location. However, the gateway 312 may be configured to communicate with the user devices they service via the channel ALPHA, while the gateway 316 may be configured to communicate with the user devices the gateway 316 services via the channel BETA. Therefore, if the gateway 312 originally servicing the user device 350 via the channel ALPHA and the WAP 312B becomes inoperable, the WAP 312A cannot switch to or be serviced by gateway 316 because the gateway 316 only services WAPs communicating via the channel BETA. Therefore, the gateway 316 may be an unsuitable backup candidate for the gateways 312 even if the gateway 316 is located close to the gateway 312.

Another nearby backup option for the gateway 312 may be the gateway 314. However, while the gateway 312 may connect user devices (e.g., the user device 350) to networks provided by the network service provider I, the gateway 314 may connect user devices to networks provided by another network service provider, such as the network service provider II. Different network service providers (e.g., the network service providers I and II) may have different network communication protocols, and therefore, gateways of different network service providers may be unsuitable to serve as backups of each other. Therefore, the WAP 312B, originally serviced by the gateway 312, may be unserviceable by the gateway 314 as the gateway 314 services user devices using a different network communication protocol than the gateway 312 uses servicing the user device 350. Being connected to networks provided by different network service providers may make the gateway 314 a poor backup option for the gateway 312.

Yet another nearby backup option for the gateway 312 may be the gateway 318. However, there may be sources of interference between or near the two gateways. Many sources of interferences (e.g., obstructions and/or clutters) may impact wireless communications between gateways, user devices, WAPs, and/or other devices in the environment 310, when considering material compositions, sizes, positions, surface roughness, attenuation, reflectivity, absorption, and scattering coefficient of the sources for interferences. For example, a microwave 321 may be located between the gateway 312 and the gateway 318. Signals sent by the WAP 312B or the gateway 312 to the gateway 318 may be degraded by the presence of the microwave 321 as the microwave 321 may cause interference in the signals. Likewise, any signals sent by the gateway 318 to the gateway 312 or the WAPs 312A-B may get degraded by the presence of the microwave 321.

While the gateway 320 may be the furthest away from the gateway 312, the gateway 320 may be a more suitable backup option for the gateway 312 than the gateways 314, 316, 318. For example, there is no obstruction between the gateways 312 and 320, and the two gateways may be in the wireless range of each other. Therefore, the gateway 312 may be able to communicate reliably with the gateway 320, and vice versa. Additionally, the WAPs 312A-B being serviced by the gateway 312 may be able to connect or communicate reliably with the gateway 320, and the WAPs 320A-B may be able to connect or communicate reliably with the gateway 312. Furthermore, a user device (e.g., the user device 350) originally being serviced by the gateway 312 may be able to switch to the gateway 320 if the gateway 312 becomes affected. Furthermore, the gateways 312 and 320 and their WAPs operate on the same network channel (e.g., channel ALPHA) and are connected to networks provided by the same network service provider (e.g., service provider I). As a result, if the gateway 312 or the gateway 320 has excess workload, the overloaded gateway may assign some of its workload to the other gateway. Additionally, if one of the gateways 312, 320 becomes inoperable, WAPs of the affected gateway may connect to the other gateway.

A gateway management device 302 (e.g., the gateway management server 122 hosting the gateway management system 132, the mobile devices 125 hosting the gateway management system 132, or any device in the environment 310 hosting a gateway management system) may be configured to identify suitable backup gateways for one or more gateways in the environment 310 and associate such suitable backup gateways with each other to form a cluster of gateways. A gateway management device 302 may determine whether two or more gateways are suitable backups of each other by examining communication characteristics of the gateways' environment. This may include, for example, determining wireless signals that are detected by any of the wireless devices in the environment (e.g., gateways, WAPs, etc.), wireless signals they are sending, and/or wireless signals that one wireless device sends, but the other does not receive. This may include determining signal characteristics, such as strengths, of such signals. This may include determining operating parameters of the wireless devices, such as the protocols, networks, etc., that the wireless devices use for their communications.

The gateway management device 302 may obtain these communication characteristics by configuring the wireless devices (e.g., gateways and/or the WAPs) to perform wireless scans. For example, one or more scanning applications may be downloaded and/or installed in the gateways and/or the WAPs. The scanning applications may be instantiated as a software application residing on or embedded within the devices. The gateway management device 302 may be configured to send instructions 322 to the gateways and/or WAPs in the environment to perform wireless scans. The devices may instantiate the scanning application upon receiving the instructions 322.

After receiving the instructions 322 from the gateway management device 302, various gateways (e.g., the gateways 312, 314, 316, 318, 320) and/or WAPs (e.g., the WAPs 312A-B, 314A-B, 318A-C, 320A-B) in the environment 310 may scan or listen for signals from other devices. Gateways (e.g., the gateways 312, 314, 316, 318, 320) and/or WAPs (e.g., the WAPs 312A-B, 314A-B, 318A-C, 320A-B) in the environment may determine the gateways and WAPs they can successfully detect. For example, a gateway may determine that it detects signals from multiple gateways and/or WAPS, and make a list of those gateways for the gateway management device 302. Additionally, a gateway may determine that it can detect another gateway if the strength of the signal received from the other device is above a certain signal strength threshold (e.g., above −60 dBm indicating high quality signal, above −70 dBm for adequate quality signal, or above −80 dBm for basic connection, and below −80 dBm being essentially unusable). Similarly, the WAP may prepare a list of gateways and/or WAPs it can detect in its wireless range. The gateways and/or WAPs may also determine the network channels used by the detected devices and network service providers associated with the detected devices.

The gateways (e.g., the gateways 312, 314, 316, 318, 320) and/or WAPs (e.g., the WAPs 312A-B, 314A-B, 318A-C, 320A-B) in the environment 310 may gather the data 324 from the wireless scans and send the data 324 to the gateway management device 302. The data 324 may indicate communication characteristics of the environment 310, such as identifying various gateways (e.g., the gateways 312, 314, 316, 318, 320) present in the environment 310, network channels (e.g., the network channels ALPHA and BETA) that are being used by the gateways in the environment 310, various WAPs connecting the user devices to the gateways, a list of gateways and/or WAPs that each of the gateways can detect in its wireless range, whether a particular gateway can always or sometimes detect or see another gateway in the environment 310 (e.g., the gateways communicating with each other or via WAPs connected to the gateways), etc. For example, the data 324 may indicate that gateways 312 can detect signals from the gateway 314, 316, 318 or WAPs 314A-b, 318A-C, the gateway 312 cannot detect signals from the gateway 318 or WAPs 318A-C, and the gateways 312, 314, 316, 320 use the network channel ALPHA to service user devices while the gateway 316 uses the network channel BETA for servicing user devices.

The gateways (e.g., the gateways 312, 314, 316, 318, 320) may also measure performances of the different gateways, bandwidth requirements of the gateways, bandwidth requirements at different locations of the environment 310, network failure rates associated with the different gateways and/or WAPs, and/or other similar data, and send the measured data to the gateway management device 302. The gateway management device 302 may be configured to store the measured wireless characteristics for each gateway and/or WAPs for a certain period of time, may only retain the last measurement, may only report the most current measurement, and/or may retain a certain number of measurements for device and/or for a certain number of devices.

Based on the data 324 generated by the gateways 312, 314, 316, 318, 320 and/or the WAPs 312A-B, 314A-B, 318A-C, 320A-B, the gateway management device 302 may associate (e.g., group or cluster) gateways that are operating on the same network channel, connected to data networks provided by the same network service provider, and/or can detect each other reliably once or multiple times over a period of time. For example, the gateway management device 302 may associate the gateways 312, 320 in the environment 310 with each other (e.g., form a gateway cluster or gateway group with the gateways 312, 320) if data from at least one wireless scan indicates that the gateways 312 and 320 can detect each other. Alternatively, multiple scans may be performed to determine the rate at which the gateways can detect each other. For example, if wireless scans are performed every two hours for twenty-four hours, the data 324 collected over the twenty-four hours may indicate that gateway 312 detects the gateway 320 eleven times out of the twelve scans, while the gateway 320 detects the gateway 312 ten times out of the twelve scans. The gateway clustering process may then determine that the gateways 312 and 320 may be included in the same cluster as they can detect each other most of the time reliably.

The gateway management device 302 may consider other factors while determining the associations between the gateways, such as physical locations of the gateways (e.g., not associate gateways when the distance between the gateways is above a threshold), bandwidth requirements of the gateways (e.g., include at least one gateway with a light workload in a cluster with one or more gateways with heavy workloads), bandwidth locations at different locations of the environments (e.g., cluster gateways in areas with high user usages), network failure rates (e.g., cluster gateways with high failure rates with at least one gateway device with low network failure rates). Alternatively or additionally, after forming one or more associations between gateways based on the wireless (e.g., RF) environment/characteristics, the gateway management device 302 may adjust the gateway clusters, form new gateway clusters, remove gateways from the gateway clusters, and/or add gateways to the gateway clusters based on the physical locations of the gateways, bandwidth requirements of the gateways, bandwidth locations at different locations of the environments, network failure rates of the gateways or at different locations of the environment, etc.

After determining the associations between the gateways based on the communication characteristics, such as the association between the gateways 312 and 320, the gateway management device 302 may send data 326 about the gateway the association to the gateways 312, 320. Additionally, the data 326 may be sent to WAPs (e.g., the WAPs 312A-B, 320A-B) connected to the gateways in the cluster. Alternatively, the gateways (e.g., the gateways 312, 320) may forward the data 326 to its WAP after receiving the data from the gateway management system 302. The data 326 may indicate the backup gateways included in the association (e.g., formed cluster or groups), addresses (e.g., IP addresses, MAC addresses, etc.) of backup gateways, and/or addresses of WAPs connected to the backup gateways. The data 326 may be used to determine a backup gateway if one of the gateways in a cluster becomes inoperable or has excess workload. For example, if the gateway 312 has an excessive workload, some or all of the gateway 312's workload (e.g., servicing the user device 350) can be redirected to the gateway 320. Additionally, if the gateway 320 becomes has an excessive workload, some or all of the gateway 320's workload can be assigned to the gateway 312. If the gateway 312 becomes inoperable, the WAPs 312A-B may use the data 326 to connect to the backup gateway 320 and/or send the data 326 to a user device being serviced by the gateway 312 to connect to connect to the gateway 320. Likewise, if the gateway 320 becomes inoperable, the WAPs 320A-B may use the data 326 to connect to the backup gateway 312. The data 326 may also be sent to other gateways or devices in the environment 310 even if other gateways or devices are not associated with the gateways 312 and 320. For example, the data 326 may also be sent to the gateways 314, 316, 318. Additionally, the gateway management device 302 may store data 326 in memory.

The gateway management device 302 may comprise a single computing device, multiple computing devices, or any desired combination of processors and devices (e.g., the gateway management server 122, the mobile devices 125 in FIG. 1, or computing devices in the premises 102A, 102B in FIG. 1 or the environment 310 in FIG. 3). The gateway management device 302 may provide a graphical user interface in order for users (e.g., network engineers) to input information about an environment (e.g., the environment 310) in which the gateways are deployed, input information about network channels in use, input rules for scheduling scans of network channels in use, input rules for associating or clustering gateways, view and adjust network gateway clusters, visualize network performance, and execute gateway cluster configuration commands, etc.

The gateway management device 302 described above offers many benefits to the wireless user devices being serviced by the gateway clusters formed based on the communication characteristics (e.g., RF environment) of the gateways and WAPs connected to the gateways. The communication characteristics of the gateways may consider, among others, wireless signal degrading effects of various sources of interferences (e.g., the microwave 321) in the environment 310, different network channels (e.g., the network channels ALPHA and BETA) used by the gateways, and/or networks provided by different network service providers (e.g., the network service providers I and II). Based on the communication characteristics of the gateways, the gateway management device 302 may identify gateways that are suitable backups of each other (e.g., group the gateway 312 and 320) and form a group of such gateways. Grouping of gateways that are suitable backups of each other may improve network performance, decrease network error rates, decrease the need for customer support or other aid, offer a much higher data rate to user devices, and/or better signal strength, signal-to-interference, signal quality, throughput, or coverage in areas with a high number of wireless user devices (e.g., multi-dwelling units, commercial buildings, university campuses, etc.).

FIGS. 4A-E illustrate an example process for identifying backup gateways based on the wireless environment/activities of the gateways and/or WAPs connected to the gateways. The various steps may be performed by components of the gateway management device 302, the gateways (e.g., the gateways 312, 314, 316, 318, 320), WAPs (e.g., WAPs 312A-B, 314A-B, 316A, 318A-C, 320A-B) connected to the gateways, and/or any other desired computing devices. The example steps in FIGS. 4A-E may be performed in different orders and with different, fewer, or additional steps than those illustrated. Multiple steps can also be combined.

Figure 4A:
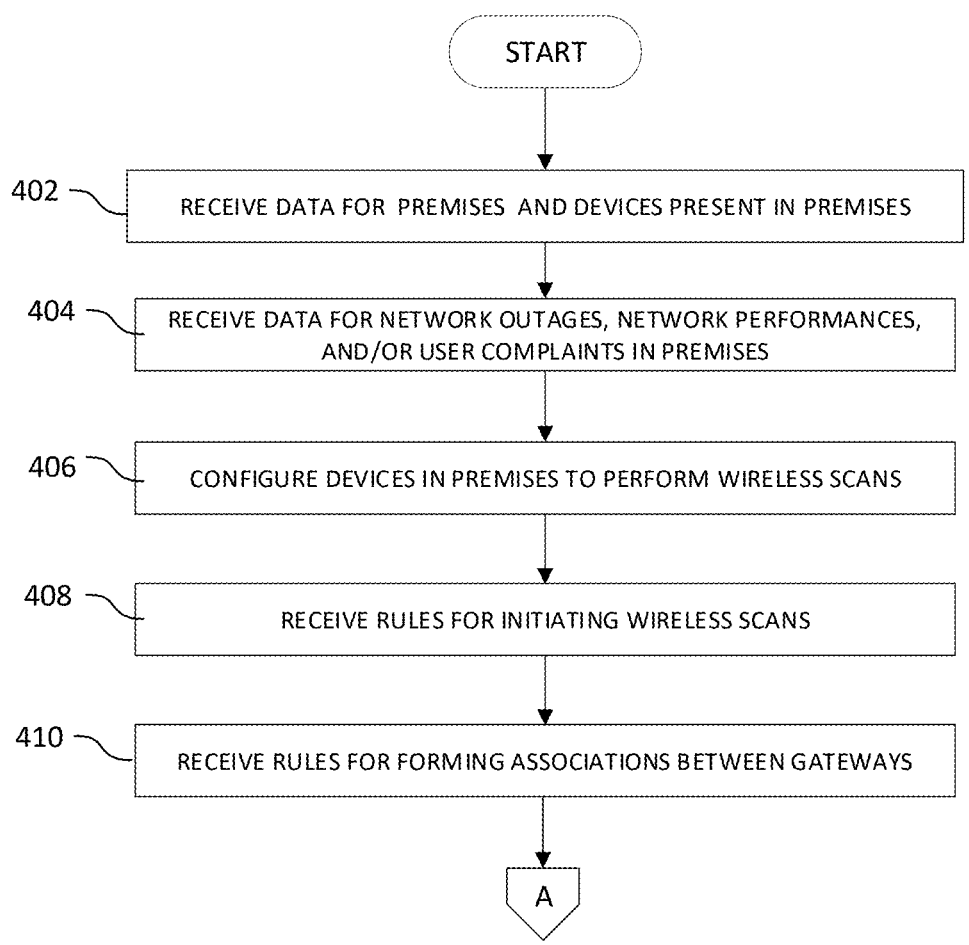
FIGS. 4A-E illustrate an example algorithm for identifying backup gateways based on communication characteristics of gateways and WAPs connected to the gateways.

At steps 402-410 of FIG. 4A, a gateway management system may be initialized in one or more computing devices, such as the gateway management device 302 in FIG. 3, the gateway management server 122 hosting the gateway management system 132 in FIG. 1, the mobile devices 125 hosting the gateway management system 132 in FIG. 1, any device in the environment 310 that may host a gateway management system in FIG. 3, or any devices in the premises 102A, 102B that may host a gateway management system in FIG. 1. Initializing the gateway management system in the computing devices may comprise downloading a software installation package, installing the software installation package, and configuring the gateway management system to operate based on any rules described herein to access and process any data described herein.

At step 402 of FIG. 4A, data may be received for premises (e.g., single-dwelling premises 102A, multiple dwelling premises 102B, the example premise 130) being serviced by a local office (e.g., the local office 103). In addition, data may be received about devices (e.g., gateways, WAPs, etc.) present in the premises that provide accessibility to user devices in the premises to the local office (e.g., the local office 103), and/or networks inside and/outside the premises. The data for the premises may comprise physical addresses of the premises, one or more user accounts associated with users present in the premises, level of data services provided for different user accounts associated with the premises, information about users presents in the premises, and/or other data related to the premises and users present in the premises. The data about the deployed devices may comprise information about gateways present in the premises, WAPs connected to the gateways, and/or gateways with internal WAPs. The data about the deployed devices may comprise unique identifiers of the devices (e.g., MAC or IP addresses of gateways, MAC or IP address of WAPs, BSSID of WAPs, etc.), locations of the devices (e.g., latitude/longitude, geo-encoding, etc.), frequency bands (e.g., 2.5 GHz, 5 GHz, 56-72 GHz, etc.) and/or network channel used by the devices for wireless data communications, etc. The local office (e.g., the local office 103) may maintain one or more databases to store the data for the premises and/or the data for the deployed devices. Information about a particular premise and/or a particular device may be stored in the databases when the device is deployed in the premise to service user devices or when a user account is opened for users present in the premises. Additionally, information in the databases may be periodically updated (e.g., updated location of the gateways and/or WAPs, updated MAC or IP addresses, etc.) by sending one or more requests to the devices to send the updated information. Providing a gateway management system (e.g., the gateway management device 302, the gateway management system 132) data about devices deployed in the various premises may comprise configuring the gateway management system to access and retrieve data from these databases maintained by the local office. Information about the various premises being serviced by the local office and/or gateways deployed at the premises may aid the gateway management system to identify geographic areas comprising multiple premises or a single premises with a high density of user devices and/or network usage. The gateway management system may cluster gateways deployed in the identified areas such that the user devices in the identified areas experience a better quality of network service and/or better network performances.

At step 404, data may be received about network outages and/or complaints received from user devices located at the various premises. In addition, data may be received about network usage and/or performance metrics of devices (e.g., gateways, WAPs, etc.) deployed at the various premises. The local office may maintain one or more databases tracking network outages and/or complaints received from user devices located at the various premises. Providing a gateway management system (e.g., the gateway management device 302, the gateway management system 132) with information about the network outages and/or user complaints may comprise configuring the gateway management system to access and retrieve data from databases storing information about the network outages and/or complaints received from user devices of the various premises. The network usage and performance metrics of the devices may include received signal strength intensity (RSSI), throughput, contention level, bandwidth used, bandwidth requirements, RF signal usage patterns, various network failure rates (e.g., bit error rate (BER), packet error ratio (PER), frame error rates (FER), etc.), system noise (SNR), system interference (SIR), delay spread levels, power delay profile, packet jitter, quality of service (QoS), packet error rate, packet latency, and/or other similar characteristics) associated with the devices. A local office (e.g., the local office 103) initializing or configuring the gateway management system may periodically measure network usage and performance metrics of the deployed devices by sending requests to the devices to measure and report the metrics. The local office may then maintain one or more databases that store the network usage and performance metrics of the devices deployed in the various premises. The gateway management system may then be configured to access and retrieve data from databases storing information about the network outages and/or complaints received from user devices of the various premises. Information about network outages, user complaints, and/or network usage and performance metrics at the various premises may aid the gateway management device to identify one or more areas with higher than normal network outages and/or user complaints, areas with high network usage, and/or areas with poor network performance metrics.

At step 406, some or all of the devices (e.g., the gateways 312, 314, 316, 318, 320, WAPs 212A-B, 314A-B, 318A-C, 320A-B) in the various premises may be configured to perform wireless scans after receiving instructions to initiate such scans from the gateway management device. The devices in the premises (e.g., the gateways 312, 314, 316, 318, 320, WAPs 312A-B, 314A-B, 318A-C, 320A-B) may comprise transmitter/receiver circuitry, wireless controller circuitry, and/or other circuitry that may be capable of scanning among a plurality of network channels in one or more wireless frequency bands to detect signals (e.g., beacons) from other devices broadcasting wireless signals within the wireless range of the devices. As the devices have limited wireless ranges (e.g., 120-400 feet), devices located at different locations of the premises may cover the entire wireless environment of the premises. Configuring the devices in the premises may comprise installing software modules and/or APIs (e.g., WIN 32, WIN 64, CORE JAVA API, or ANDROID APIs) that uses the circuitries to detect signals from other devices (e.g., detect signals, beacons from gateways, WAPs) and send information about the detected devices to the gateway management system. Additionally, configuring devices in the premises may comprise identifying other devices that have sent signals or above a certain signal strength threshold (e.g., above −60 dBm indicating high quality signal, above −70 dBm for adequate quality signal, or above −80 dBm for basic connection) as neighboring gateways. The software modules and/or APIs may also comprise instructions for measuring network usage and/or performance metrics of the detected devices and send reports about the measured metrics to the gateway management device. In addition, one or more databases may be created by the gateway management device to store the reported metrics.

At step 408, rules may be received for initiating wireless scans of the wireless environment in the premises. Some of the rules may indicate when wireless scans may be initiated. The rules may indicate that instructions for initiating wireless scans may be sent to devices in the premises (e.g., gateways, WAPs, etc.) at random times (e.g., random times throughout an hour, day, week, month, during peak network usage hours, etc.), and/or at regular intervals (e.g., every hour, two hours, three hours, day, two days, week, two weeks, or month, every hour during peak network usage hours and longer intervals during non-peak hours, etc.). Alternatively, or additionally, the rules may indicate that wireless scans may be scheduled in a particular premise based on the network usages and/or performance metrics of devices located at that particular premise. For example, instant or frequent scans (e.g., every hour, two hours, three hours, etc.) can be automatically scheduled for premises with a high number of network outages, a high number of complaints from user devices, high bandwidth use, high bandwidth requirements, high level of wireless device usage, and/or high network failure rates. In contrast, if network usages and/or performance metrics of the devices for a particular premise indicate low bandwidth requirements, low wireless device usage level, and/or low network failure rates, wireless scans spaced further apart for that particular premise (e.g., every day, two days, week, two weeks, or month, etc.). As will be explained below, the wireless scans may provide information indicating which gateways can successfully communicate with which other gateways so that suitable backups may be clustered.

At step 410, rules may be provided for determining suitable backups for a gateway deployed at a premises and forming an association between the gateway and the backups (e.g., clustering the gateway and the backups). The rules may specify grouping gateways that are suitable backups of each other. The rules may specify identifying suitable backups of gateways present in a premises from the data collected from performing wireless scans in the premises. Such rules may indicate that gateways that can detect each other once in one wireless scan or detect each other reliably over multiple wireless scans may be suitable backups and/or may be grouped to form a gateway cluster. Additionally, the rules may further specify that backup gateways should operate on the same network channel, connect to data networks provided by the same network service provider, and/or use the same communication protocol. Rules may also be provided for adjusting the associations between the gateways (e.g., associating a new gateway as a backup gateway, etc.) or the gateway clusters (e.g., adding a gateway to a group, removing a gateway from a group, etc.) based on physical locations of the gateways (e.g., not cluster gateways when the distance between the gateways is above a threshold), bandwidth requirements of the gateways (e.g., include at least one gateway with a light workload in a cluster with one or more gateways with heavy workloads), bandwidth requirements where the gateways are located (e.g., cluster gateways in areas with high user usages), network failure rates (e.g., cluster gateways with high failure rates with at least one gateway device with low network failure rates), etc.

The rules may also indicate when to schedule the association process (e.g., clustering process) of the gateways. For example, the association process may be scheduled at regular intervals (e.g., once a week, once in two weeks, once in two months, etc.). Alternatively, or additionally, the rules may indicate that the association process (e.g., clustering process) may be automatically triggered or scheduled when any of the network usage and/or performance metrics provided at step 404 or measured during wireless scans satisfy the rules. For example, the rules may indicate to automatically trigger or schedule the association process (e.g., clustering process) if a quantity of networks outages is above a threshold value (e.g., five network outages within the last twenty-four hours), a quantity of customer complaints is above a threshold value (e.g., more than ten complaints within the last two hours), when network failure rates of deployed gateways are above a threshold value, when a usage level, a contention level, or a jitter level of a network channel is above a threshold value, etc. The rules may also specify only to initiate or schedule an association process (e.g., clustering process) when enough data from scanning the wireless network channels are available. For example, some of the rules may specify that only one set of data from scanning the network channel one time is enough. Alternatively, or additionally, the rules may specify data from at least a minimum number of scans triggered within the past day, two days, three days, or a week may need to be available to initiate or schedule an association process (e.g., clustering process)

Figure 4B:
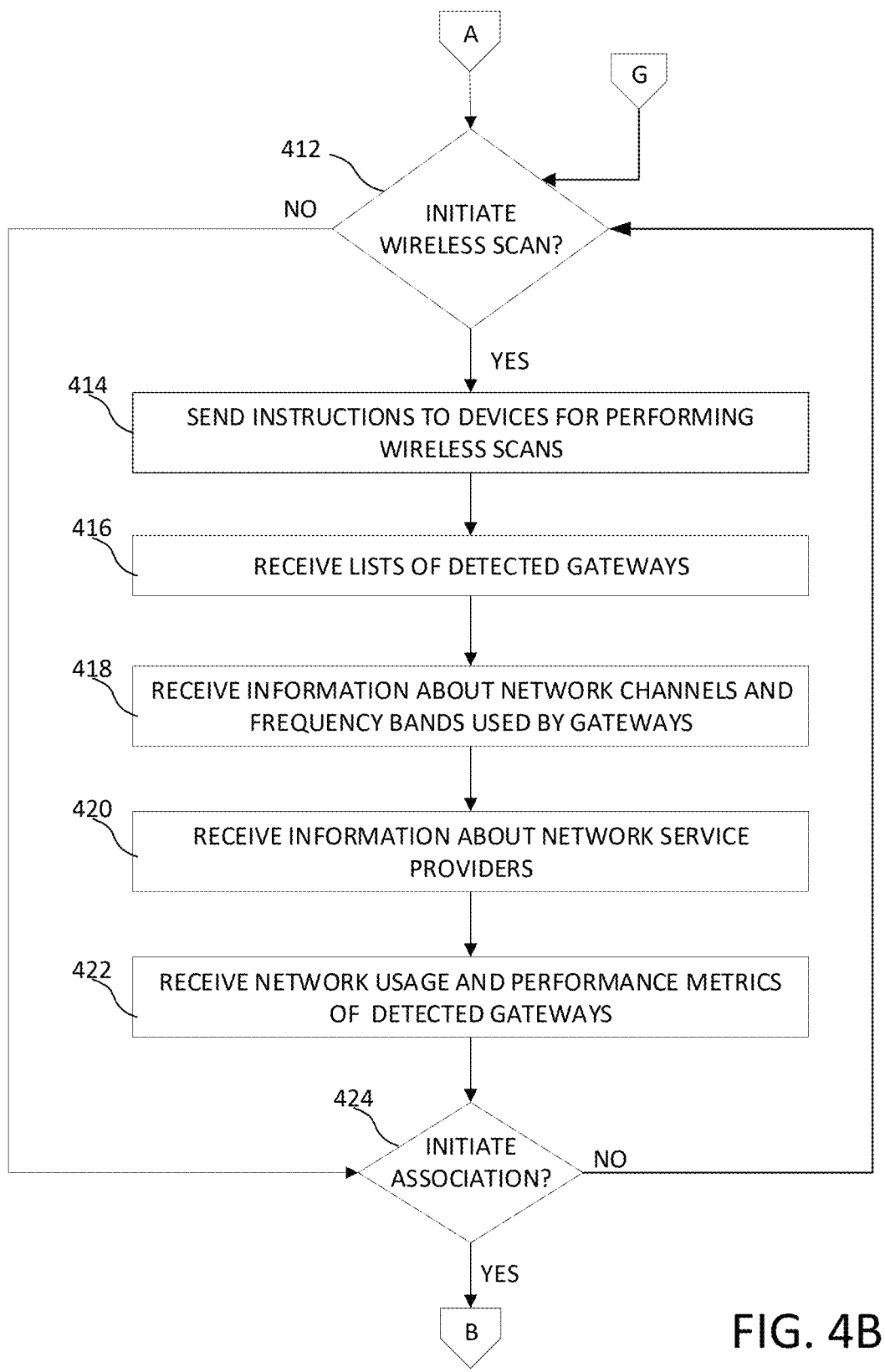

At step 412 of FIG. 4B, it may be determined whether wireless scans should be initiated by gateway devices configured at step 406. The determination may be made based on rules specified at step 408. For example, the rules may specify that a wireless scan may be initiated at random times (e.g., random times throughout an hour, day, week, month, during peak network usage hours, etc.), at regular intervals (e.g., every hour, two hours, three hours, day, two days, week, two weeks, or month, every hour during peak network usage hours and longer intervals during non-peak hours, etc.), or based on network usage and/or performance metrics of devices located at the selected area (e.g., a high number of network outages, a high number of complaints from user devices, high bandwidth use, high bandwidth requirement, high level of wireless device usage, and/or high network failure rates). If it is determined that a scanning process should be initiated, the process may proceed to step 414. Otherwise, the process may proceed to step 424.

At step 414, instructions may be sent to gateways and/or WAPs configured at step 406 to perform wireless scans. Alternatively, or additionally, the gateways and/or WAPs may initiate wireless scans themselves based on a schedule determined by the gateways and/or WAPs or based on a schedule provided by the gateway management system. The gateways and/or WAPs configured at step 406 may use their scanning circuitry to listen for and detect signals (e.g., BEACONs, wireless signals, RF signals) from gateways and WAP within their wireless range. The signals may comprise a service set identifier (SSID) of the network provided by the detected gateway or the WAP, a basic service set identifier (BSSID) for the detected WAP, an identifier for the gateway, a frequency band (e.g., 2.4 GHz, 5 GHz, 60 GHz, and others) and/or a network channel of the network frequency band that the gateway or the WAP is operating on, communication protocols or standards (e.g., 802.11ac, n, a, b, g, etc.), etc. The gateways and/or WAPs configured at step 406 may detect gateways within their wireless range by discovering signals (e.g., BEACONS) from the gateways or WAPs connected to the gateways. The signals detected by the gateway and/or WAPs performing the wireless scans may indicate that the detected gateways or WAPs are using a particular network channel for communications (e.g., BEACONS indicating the selected network channel) and/or associated with a particular network service provider.

At step 416, one or more lists of detected gateways that can be detected by each gateway performing wireless scans may be received. The gateways in the lists may be identified based on any unique identifiers associated with the gateways, an IP address, serial number, latitude/longitude, geo-encoding, an assigned unique identifier, global unique identifier (GUID), identifier associated with the manufacturer or service provider, a model or type of gateway, etc.). FIG. 5 illustrates example data 500 collected one round of wireless scan performed by various gateways and/or WAPs in a premises (e.g., a multi-story building) and sent to the gateway management system. The gateway A may send a list of gateways the gateway A detected by listening for signals during a wireless scan. As shown in FIG. 5, an example list of gateways detected by the gateway A may comprise the gateways B, D, E, F, J, and H. Similarly, the gateways B-T may send lists of gateways they detect.

The lists may also indicate external WAPs (e.g., not built-in) connected to the gateways performing the wireless scans or detected during wireless scans. The external WAPs may be identified in the lists based on identifiers associated with the WAPs and included in the signals broadcasted by the WAPs (e.g., basic service set identifiers (BSSID), a media access control address (MAC address), one or more of an IP Address, serial number, latitude/longitude, geo-encoding, custom assigned unique identifier, global unique identifier (GUID), an identifier associated with the manufacturer, a model or type of device, a service provider associated with the WAP, etc. For example, as shown in FIG. 5, a list sent by the gateway A may also indicate that the external WAPs AP1, AP2, AP3, and AP4 are connected to or are being serviced by the gateway A. Similarly, the gateways B-T may send lists of external WAPs being serviced by the gateways B-T.

At step 418, information may be received about the network channels and/or frequency bands used by the gateways performing the wireless scans for communications. For example, the information may indicate that a particular gateway is operating on a particular network channel of a particular frequency band (e.g., network channels ALPHA and BETA described above and below, networks channels defined by the IEEE standards in 2.4 GHz band, 5 GHz band, and 60 GHz frequency bands). For example, as shown in FIG. 5, the gateways A-L may indicate that they are using channel ALPHA for communications, while the gateways M-T may indicate that they are using the channel BETA.

At step 420, information may be received about the network service providers associated with the gateways. For example, as shown in FIG. 5, the gateways A-G may indicate that they are connected to networks provided by the network service provider I, while the gateways H and I may indicate that they are connected to networks provided by the network service provider II. Additionally, or alternatively, data from the wireless scans may indicate unique identifiers of the identified gateways and external WAPs (e.g., BEACONs broadcasted by the gateways and WAPs may comprise IP address, MAC address, or BSSID of the networks provided by the gateways and WAPs). A local office (e.g., 103) of a network service provider may maintain one or more database tracking devices at different locations, as described in step 402. For example, the local office (e.g., the local office 103) may record MAC addresses, IP addresses, and/or any assigned unique identifiers of gateways deployed at various locations. Therefore, the MAC address, the serial number, IP address, or a unique identifier assigned to the identified gateway may be compared with records maintained by the service provider at the local office to identify whether the identified gateway is connected to networks provided the network service provider. Additionally, or alternatively, the IP address or a unique identifier of the gateway assigned by the service provider of the gateway may indicate the service provider associated with the gateway.

The gateways and/or WAPs configured at step 406 may also be configured to measure network usage and/or performance metrics of itself and/or detected devices (e.g., other detected gateways and/or WAPs). For example, a gateway or a WAP may send requests to gateways and WAPs detected within its wireless range to measure the detected devices' network usage and/or performance metrics. The measured network usage and/or performance metrics may indicate RSSI, throughput, contention level, bandwidth used, bandwidth requirements, RF signal usage patterns, BER, PER, FER, SNR, SIR, delay spread levels, power delay profile, packet jitter, QoS, packet error rate, packet latency, and/or other similar characteristics of the gateways and devices. The positional coordinates of the detected devices may also be requested along with the network usage and/or performance metrics request. Position coordinates of the gateway may take the form of {x, y, z}, {x, y, floor}, {x, y, elevation}, {x, y}, {latitude, longitude, elevation}, {latitude, longitude}, or any other similar coordinates. Such position coordinates may be used to refine formed gateways clusters, as described further at step 456. At step 422, data indicating the network usage and/or performance metrics of the gateways and WAPs identified may be sent to the gateway management system. The data may be used later for clustering the gateways.

At step 424, a determination may be made as to whether an association process (e.g., clustering process) should be initiated. The determination may be made based on rules specified in step 410. For example, the rules may specify that the association process (e.g., clustering process) may be initiated at regular intervals (e.g., once a week, once in two weeks, once in two months, etc.) or when any of the network usage and/or performance metrics provided at steps 404 or measured during wireless scans is above a threshold value (e.g., five network outages within the last twenty-four hours, more than ten complaints within the last two hours). Additionally, the association process (e.g., clustering process) may be initiated when enough data from scanning the network channels are available (e.g., a minimum number of scans triggered within the past day, two days, three days, or a week may need to be available, etc.). A single wireless scan might not indicate an accurate picture of the communication characteristics of the gateways and/or WAPs present in a premises. For example, some of the gateways or WAPs may be offline when a wireless scan is performed. Additionally, a temporary source for interferences may be present during one wireless scan between two gateways that would otherwise be suitable backups in a gateway cluster. Therefore, data from multiple wireless scans may be preferred for the clustering process (e.g., at least twelve scans in the last twenty hours, 20 scans in the last week, etc.). If it is determined that clustering should be initiated, the process may proceed to step 426. Otherwise, the process may proceed to step 414.

Figure 4C:
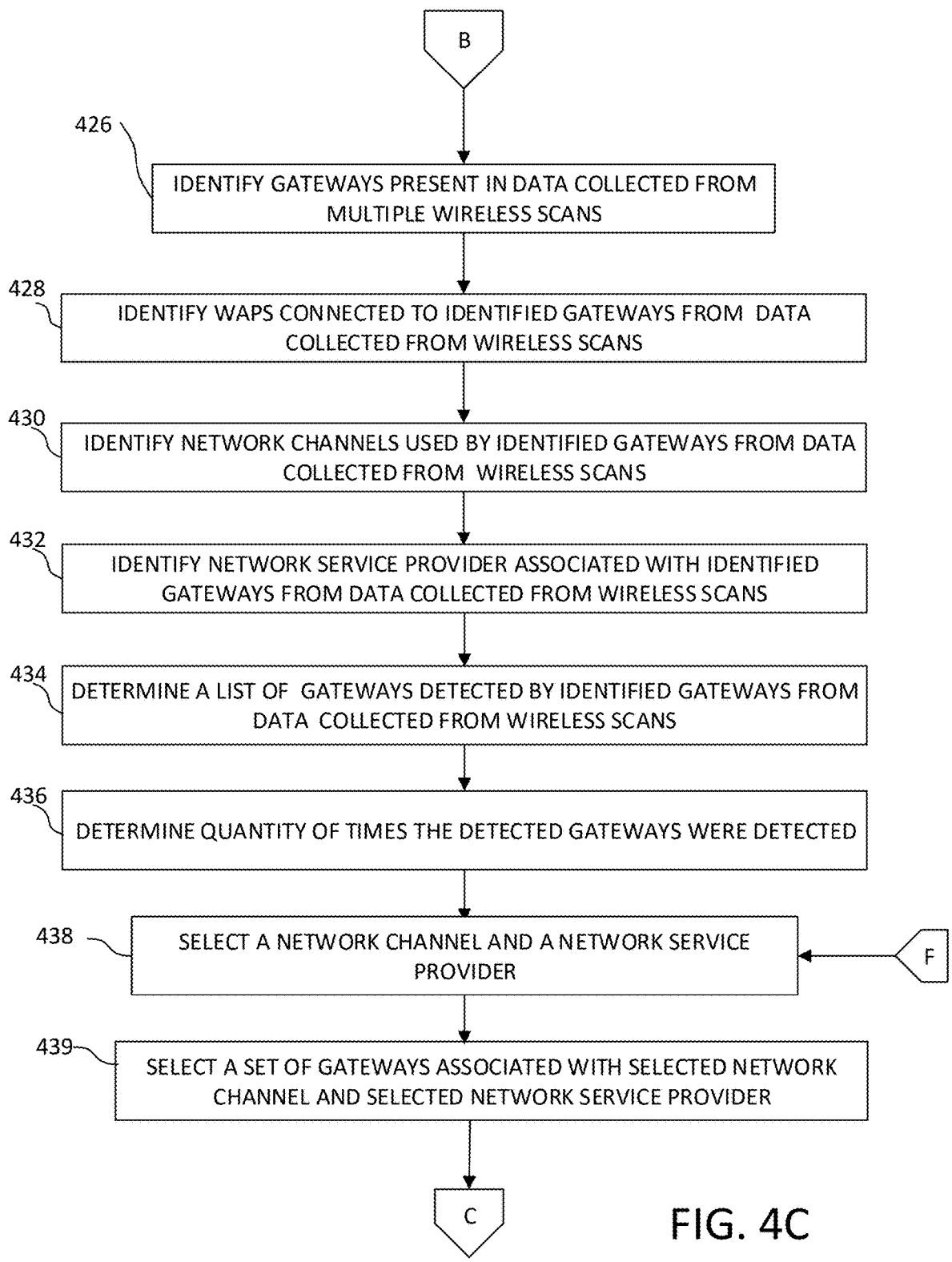

At steps 426-436 of FIG. 4C, data from multiple wireless scans may be compiled for the clustering process. Steps 426-436 will be described with the help of FIG. 6A that shows a compilation of data from multiple wireless scans in the last twenty-four hours by the gateways listed in FIG. 5. For simplicity, only the data compiled for the gateways using the network channel ALPHA are shown in FIG. 6, but the compilation steps may also produce data for gateways using other network channels (e.g., the other network channel BETA in FIG. 5).

At step 426, data received from multiple wireless scans may be analyzed to identify gateways present in a premises (e.g., a multi-dwelling premises with multiple gateways). While a single scan may indicate active gateways at the time when the scan was initiated or performed, the single scan might not account for all the gateways present on the premises. For example, one or more gateways may be switched off for maintenance or sudden power loss when the single scan is initiated or performed. Taking data from multiple wireless scans within a time period (e.g., scans taken in the last hour, twelve hours, twenty-four hours, forty-eight hours) or multiple time periods (e.g., scans taken during 8 am to 5 pm every weekday, scans taken from 5 pm to 10 pm every day, etc.) may increase the likeliness that all gateways present on the premises have been identified. Gateways determined at step 426 may comprise gateways that have been detected at least once during scans scheduled or initiated during a single time period or multiple time periods. For example, FIG. 6A shows a table listing data 600 compiled over multiple scans over the previous twenty-four hours. The complied data 600 may show that gateways A, B, C, D, E, F, G, H, I, J, K, and L are present on the premises (as indicated by column 604 in FIG. 6A).

Similarly, at step 428, data received from multiple wireless scans may be examined to identify various WAPs (e.g., WAPs external to the gateways) connected to the identified gateways of step 426. A single wireless scan might not account for all WAPs. Therefore, taking multiple scans taken within the same time period or multiple time periods for the gateways into consideration may increase the likelihood that most of the WAPs have been identified. After forming the gateway clusters as described below, information about the gateway clusters may also be sent to the WAPs identified at step 428. As shown in FIG. 6A, gateway A may have provided data from one or more wireless scans that the gateway A is providing backhaul data connections between WAPs AP1, AP2, AP3, and AP4 (as indicated by column 606 in FIG. 6A).

At step 430, data received from multiple wireless scans may be analyzed to identify network channels used by the gateways identified at step 426. For example, as described at step 418, information may be received about the network channels and/or frequency bands used by the gateways and/or WAPs performing the wireless scans. As shown in FIG. 6A, the data from multiple wireless scans may indicate that the gateways A-L are using channel ALPHA for communications (as indicated by column 602 in FIG. 6A).

At step 432, data received from multiple wireless scans may be analyzed to identify network service providers for the identified gateways at step 426. For example, as described at step 420, information may be received about the network service provider associated with the gateways and/or WAPs performing the wireless scans. Alternatively, data from the wireless scans may indicate unique identifiers of the identified gateways and WAPs (e.g., BEACONs broadcasted by the gateways and WAPs may comprise IP address, MAC address, or BSSID of the networks provided by the gateways and WAPs). A local office (e.g., 103) of a network service provider may maintain one or more database tracking devices at different locations, as described in step 402. For example, the local office (e.g., the local office 103) may record MAC addresses, IP addresses, and/or any assigned unique identifiers of gateways deployed at various locations. Therefore, the MAC address, the serial number, IP address, or a unique identifier assigned to the identified gateway may be compared with records maintained by the service provider at the local office to identify whether the identified gateway is connected to networks provided the network service provider. Additionally, or alternatively, the IP address or a unique identifier of the gateway assigned by the service provider of the gateway may indicate the service provider associated with the gateway. As shown in FIG. 6A, the gateways A, B, C, D, E, F, G, and J may be determined to be associated with the service provider I, while the gateways H, I, K, and L may be determined to be associated with the service provider II (as indicated by column 608 in FIG. 6A).

At step 434, data received from multiple wireless scans may be analyzed to identify a list of gateways detected by each of the identified gateways of step 426. The list of detected gateways of a gateway identified at step 426 may comprise gateways that have been detected at least once by the selected gateway during multiple scans scheduled or initiated during the time period. For example, as illustrated in FIG. 6A, the list of gateways detected by the gateway A may comprise the gateways, B, D, E, F, J, and H, and the list of gateways detected by the gateway B may comprise the gateways, A, C, D, and L (as indicated by column 610 in FIG. 6A).

At step 436, data received from multiple wireless scans may be analyzed to identify, for each of the neighboring gateways in the list of detected gateways determined at step 434 for an identified gateway of step 426, the quantity of wireless scans in which the identified gateway of step 426 received a beacon or a signal from a detected gateway. The identified gateway may detect the detected gateway in every scan, most of the scans, or some of the scans. For example, as illustrated in FIG. 6A, for twelve scans performed within the last twenty-four hours, the gateway A may have detected the gateway B three times, the gateway D eight times, the gateway F eleven times, and the gateway J five times. The quantity of times the identified gateway detected the other gateway might not be necessarily the same as the quantity of times the other gateway detected the identified gateway. For example, the gateway A detected the gateway F eleven times, but the gateway F detected the gateway A five times. Moreover, while the identified gateway may detect another gateway one or more times, the other gateway may not detect the identified gate at all. For example, the gateway A may have detected the gateway D eight times, but gateway D may not have detected the gateway A at all.

This quantity of times may be useful in selecting a first gateway for a cluster of gateways. The first gateway in a gateway cluster may be designated as a parent gateway, while the rest of the gateways in the cluster may be designated as child gateways. The first gateway may be configured to assign, reassign, and/or manage workloads among itself and the other gateways in the cluster. Therefore, it may be important for the first gateway to be able to detect the other gateways in the cluster in most of the scans as the first gateway may be coordinating the assignments of workloads of an affected gateway in the gateway cluster. A gateway with a large number (e.g., quantity) of detected neighboring gateways may be chosen as a first gateway of a gateway cluster.

Compilation of the data from multiple wireless scans may indicate that more than one network channel may be used by the gateways in a premises (e.g., FIG. 5 shows that gateways in a premises may be using both the network channel ALPHA and BETA). Clustering gateways using the same network channel would result in easy transfer of workload from an affected gateway to a backup gateway and/or easy transfer of a WAP from an affected gateway to a backup gateway. Therefore, a gateway management system may prefer clustering gateways that are using the same network channel. Therefore, at step 438 in FIG. 4C, a particular network channel may be selected. The network channel ALPHA is selected to describe the clustering process in steps 440-460.

The gateways and WAPs identified at steps 426 and 428 can be connected to networks provided by different network service providers (e.g., network service provider I and network service provider II as described above, Internet Service Providers such as XFINITY, AT&T, VERIZON, CENTURYLINK, etc.). Some network service providers may place restrictions on whether their gateways can be assigned workload that was originally assigned to a gateway of another network service provider as the two network service providers may have different security and/or operating protocols. Additionally, rules provided at step 410 for clustering gateways may specify that gateways connected to networks provided by the same network service provider are clustered. Therefore, at step 439, a particular network service provider may be selected. The network service provider I is selected to describe the clustering process in steps 440-460.

At step 439, a set of gateways connected to networks provided by the selected network service provider and/or using the selected network channel of step 438 may be selected from the plurality of gateways determined at step 426. For example, a subset of gateways 620 of FIG. 6B comprising the gateways A, B, C, D, E, F, G, and J from FIG. 6A that use the network channel ALPHA and are associated with the service provider I may be selected for clustering. Alternatively, gateways may be only detecting other gateways that are using the same network channel and/or are associated with same service provider. Therefore, at step 439, the set of gateways may include all gateways identified at step 426, without any restriction of being connected to networks provided by the selected network service provider and/or using the selected network channel at step 438 assuming that.

Figure 4D:
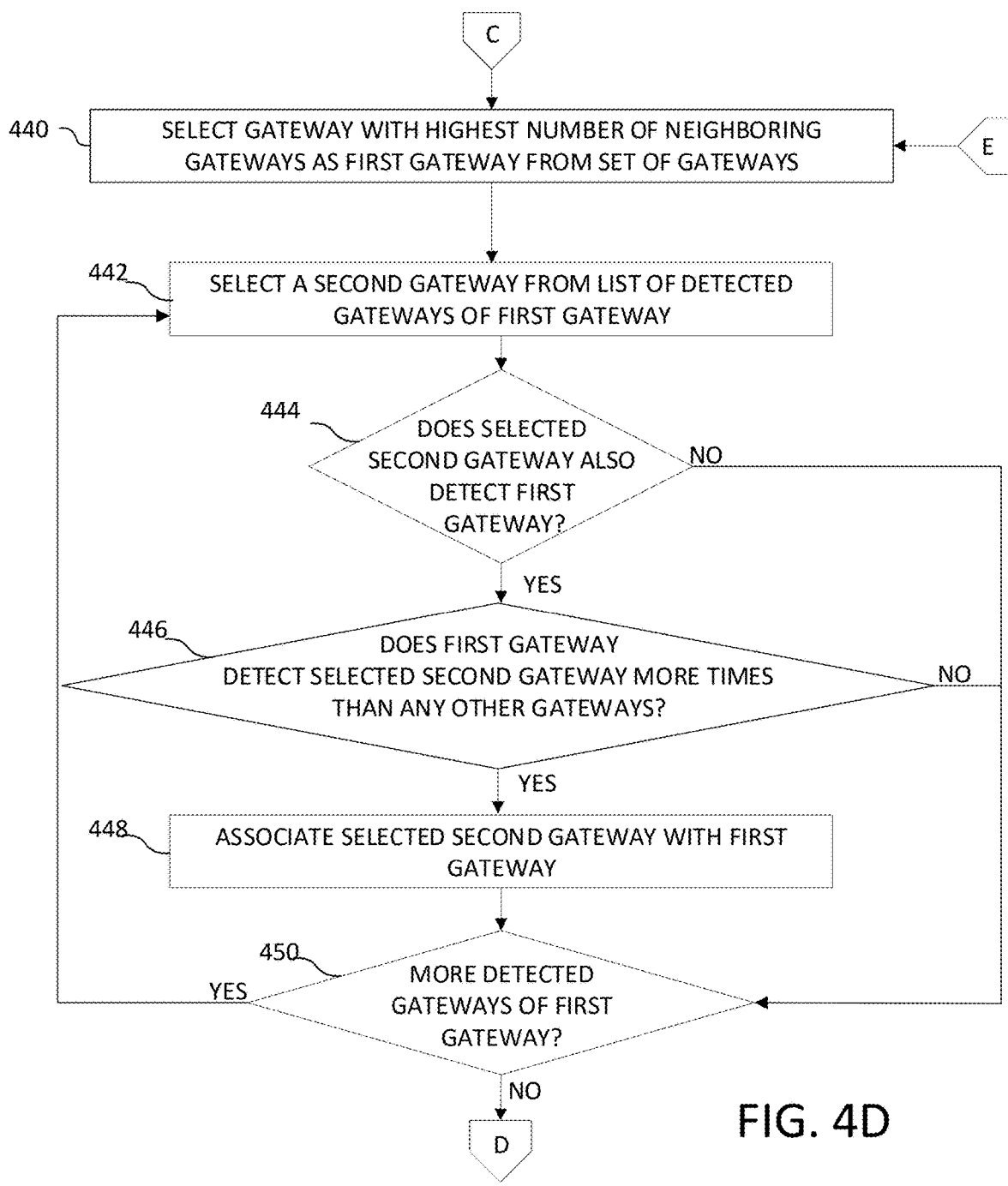
Figure 4E:
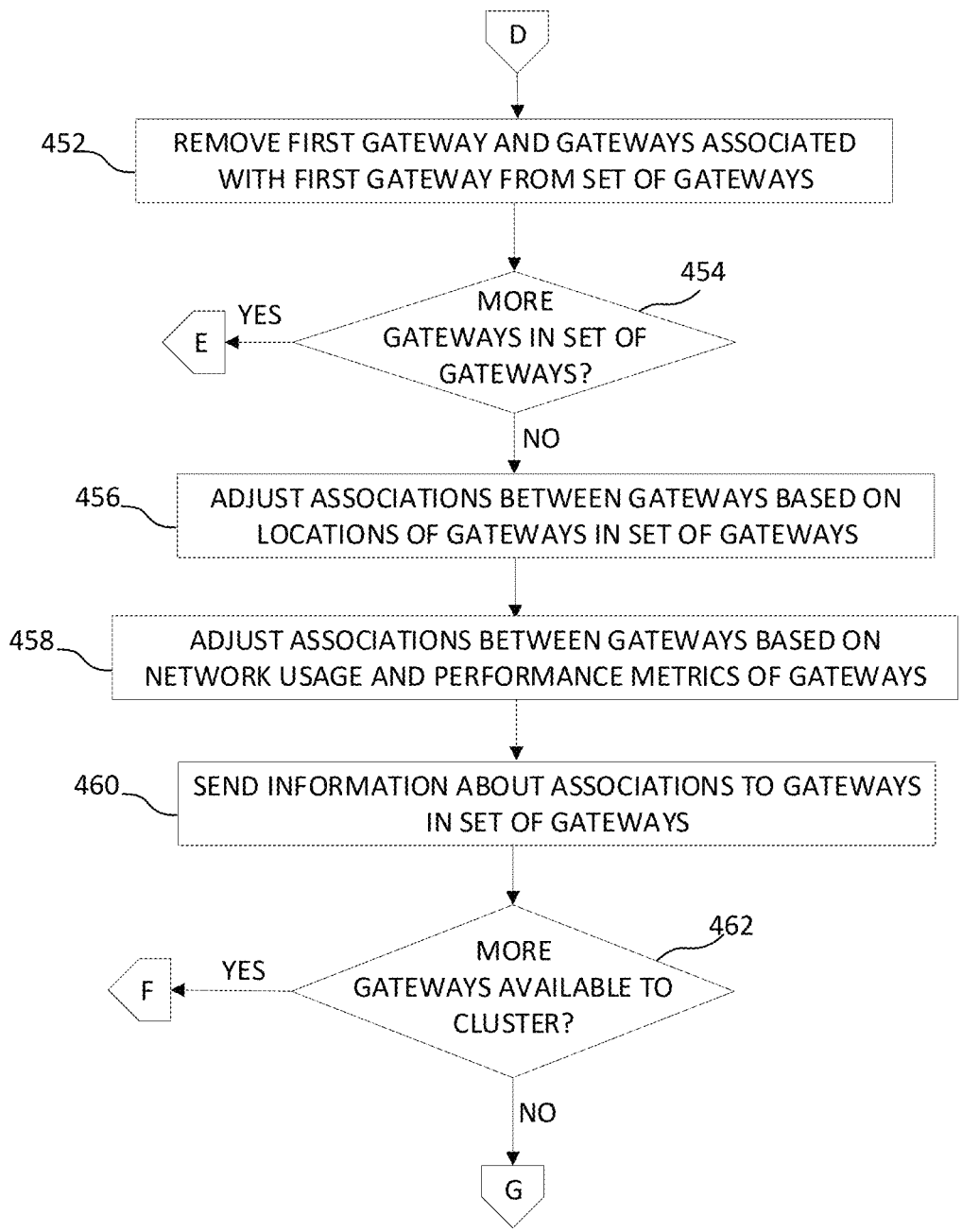

At step 440 of FIG. 4D, a gateway may be selected from the set of gateways of step 439 as a first gateway of a cluster with the criteria that the parent gateway has the highest number of detected neighboring gateways. The selected first gateway may be the parent gateway of the cluster. For example, for the example set of gateways 620 in FIG. 6B, the gateway A may be chosen as the first gateway as the gateway A has the highest number of detected neighboring gateways within the subset of gateways selected in step 439. Gateway A detected five (5) neighboring gateways, which is the most neighbors of the ones selected in step 439 and shown in FIG. 6B. As illustrated in FIG. 6C, a first gateway cluster 622 may be formed with the gateway A 624 (chosen at step 440) as the first gateway of the cluster. If multiple gateways have the highest number of detected neighboring gateways, one of the gateways may be randomly selected, or a gateway with better network usage and/or performance metrics (measured during the wireless scans) may be selected.

Alternatively, a gateway device detecting more neighboring gateways than an average number of detected neighboring gateways detected by the gateways in the set may be selected as a first gateway of a cluster. For example, for the example set of gateways 620 in FIG. 6B, the gateway A may detect five gateways, the gateways B, C, J may detect three gateways each, the gateways E and G may detect two gateways each, and the gateways D and F may detect one gateway each. Therefore, the average number of gateways detected by the subset of gateways 620 may be 2.5 gateways. A subset of gateways that have a greater number of detected gateways than the average number of detected gateways may be determined (e.g., the gateways A, B, C, J have detected more than 2.5 gateways) and a gateway with the highest number of detected gateways (e.g., the gateway A has the greatest number of detected gateways out of the gateways A, B, C, J) may be selected from the subset as a first gateway of the cluster. The gateways with more neighboring gateways than an average number of detected neighboring gateways may be gateways from areas of high network contention. Choosing such gateways as parent gateways may prioritize constructing gateway clusters with the greatest range of impact.

With a first gateway selected, the process may then turn to selecting other gateways (e.g., second gateways, child gateways) that can be clustered with the first gateway (e.g., gateways that can act as suitable backups of the first gateway). In order to the first gateway to be a suitable backup in a cluster, the other gateways in the cluster should be able to detect the first gateways reliably (e.g., be able to detect the first gateway in most of the scans) to inform the first gateway that it has excessive workload, and request the first gateway to reassign some of its workload. Therefore, gateways that can detect the first gateway reliably and more than any other gateways in the set are selected as the other member gateways of the cluster (e.g., child gateways). At step 442, a loop may begin to check each of the detected gateways that the selected first gateway (e.g., gateway A) detected, to determine which detected gateways may be suitable for clustering with the first gateway. In step 442, a next second gateway may be selected from the list of gateways that were detected by the parent gateway.

At step 444, it may be determined whether that next second gateway also detected the first gateway. For example, if gateway A is selected as the first gateway, then the loop may check to see if gateway B (detected by gateway A) also detected first gateway A. In the FIG. 6B example, it appears that gateways B, E, F, and J reported detecting gateway A, and gateways C, D, and G did not. Suppose the selected second gateway of step 442 did not detect the first gateway. In that case, the selected second gateway of step 442 may be disqualified from being a child gateway of the gateway cluster formed with the parent gateway because the selected second gateway of step 442 will not be able to communicate with the parent gateway reliably and, therefore, will not be a suitable backup in the gateway A cluster. If the selected second gateway of step 442 does not detect the first gateway, the process may skip to step 450 to check whether any more gateways need to be considered in the list of detected gateways of the first gateway. For example, while gateway A (the first gateway of the first gateway cluster 622) may detect the gateway D, the gateway D does not detect the gateway A (gateway A is not included in the list of detected gateways of the gateway D). Therefore, D may be disqualified from becoming a member gateway of the gateway cluster having the gateway A as a parent. If the selected second gateway does detect the parent gateway, then the process proceeds to step 446.

At step 466, it may be determined whether any other gateway, in the set selected in step 439, detected the selected second gateway more than the parent gateway did. For example, if gateway B is the selected second gateway for the parent gateway A, the FIG. 6B data indicates that gateway A only detected gateway B three (3) times. That data shows that several other gateways actually detected gateway B more times than gateway A did. Specifically, gateway C detected gateway B nine (9) times, and gateway J detected gateway B eight (8) times. Since, in this situation, it appears that there are other gateways that can more reliably detect gateway B, gateway B will not be clustered with gateway A. If there is another gateway in the set of gateways that detected the selected second gateway more times than the first gateway did, then the other gateway may be a better backup candidate for the selected second gateway than the currently selected first gateway. In such a situation, the second gateway may be disqualified from being a suitable backup of the first gateway and won't be added to the first gateway's cluster. In this situation, the process may proceed to step 450 to check whether there are other gateways that have been detected by the first gateway and need to be processed as possible member gateways of first gateway's cluster.

If, in step 446, the first gateway had detected the selected second gateway more than other gateways did, then at step 448, that second gateway may be associated with the parent gateway to indicate that the first gateway and the second gateway are suitable backups of each other. Associating the two gateways may comprises adding the selected second gateway to the cluster with the first gateway. After the second gateway and the first gateway are determined to be suitable backups, the process may proceed to step 450 to examine the next gateway from the list of detected gateways of the first gateway. Additionally, before proceeding to step 450, it may be determined whether the selected second gateway is within a threshold distance of the parent gateway. If the second gateway is not within the threshold distance, then then the second gateway may be disqualified to be added as a member gateway of the gateway cluster with the first gateway. Otherwise, if the second gateway is within the threshold distance, then then second gateway may be added as a member gateway of the gateway cluster with the parent gateway.

After all of the gateways in the list of detected gateways of the first gateway have been processed, the gateways that passed the qualifications at steps 444 and 446 will be considered clustered with the first gateway. Using the FIG. 6B example, the gateway A (the first gateway of the first gateway cluster 622) detected neighbor gateways B, D, E, F, and J. Of these neighbor gateways, gateway A detected gateways F and J more than any other gateways did, while there were other gateways that detected gateways B, D, E, and F more often than gateway A did. Therefore, as shown in FIG. 6C, the cluster for first gateway A may include gateways F and J. If gateway A is considered the parent gateway of the first gateway cluster 622, gateways F and J may be designated as children gateway to parent gateway A.

At step 450, it may be determined whether there are other gateways of the list of detected gateways of the first gateway that may be added to the gateway cluster of the first gateway. If there are more gateways in the list of detected gateways, the process may proceed to step 442 to select the next second gateway for consideration as a possible member of the cluster with the first gateway. Otherwise, the cluster for this first gateway is complete, and the process proceeds to step 452 in FIG. 4E, where gateways included in the cluster are removed from the set of gateways of step 439. For example, the set of gateways 620 in FIG. 6B may be reduced to the set of gateways 630 in FIG. 6D after the gateways A, F, and J are removed from the set of gateways 620 after the first gateway cluster 622 (comprising the gateways A, F, J) are formed.

Figure 6D:
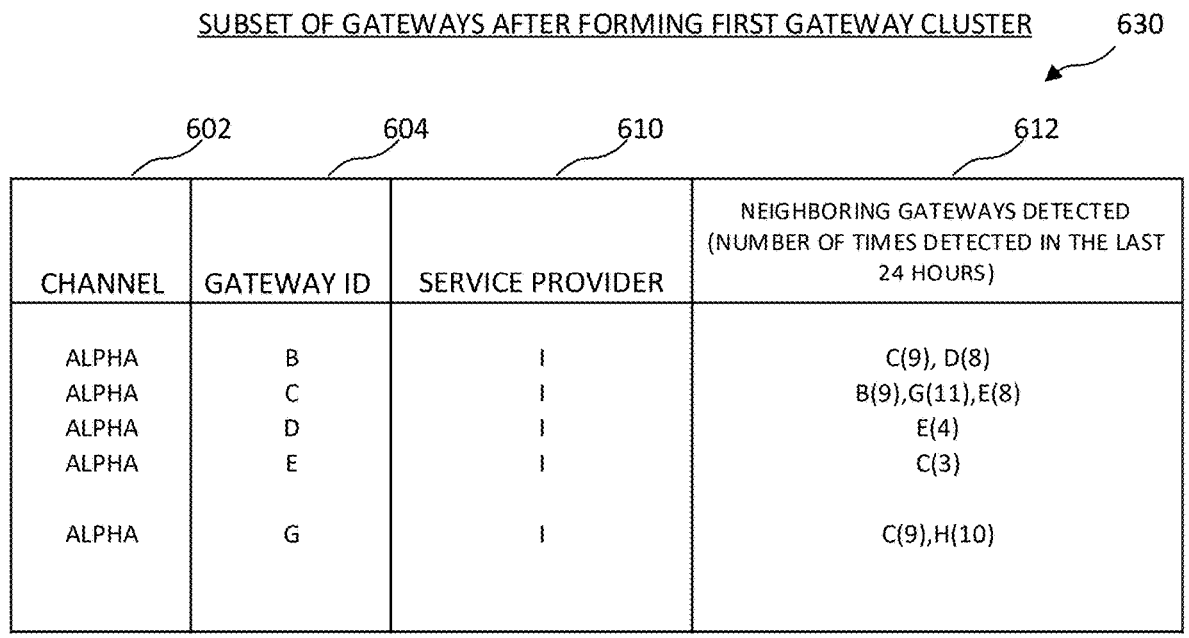

At step 454, it may be determined whether there are more gateways in the set of gateways that have not been included in a cluster yet. If more ungrouped gateways are remaining in the set of gateways 620, the process may return to step 440 to form another cluster by selecting a new first gateway from the remaining gateways. FIG. 6D shows that, after forming the first cluster 622 and removing gateways A, F, and J from the subset 620, the remaining subset of gateways 630 may comprise the gateways B, C, D, E, and G.

Figure 6E:
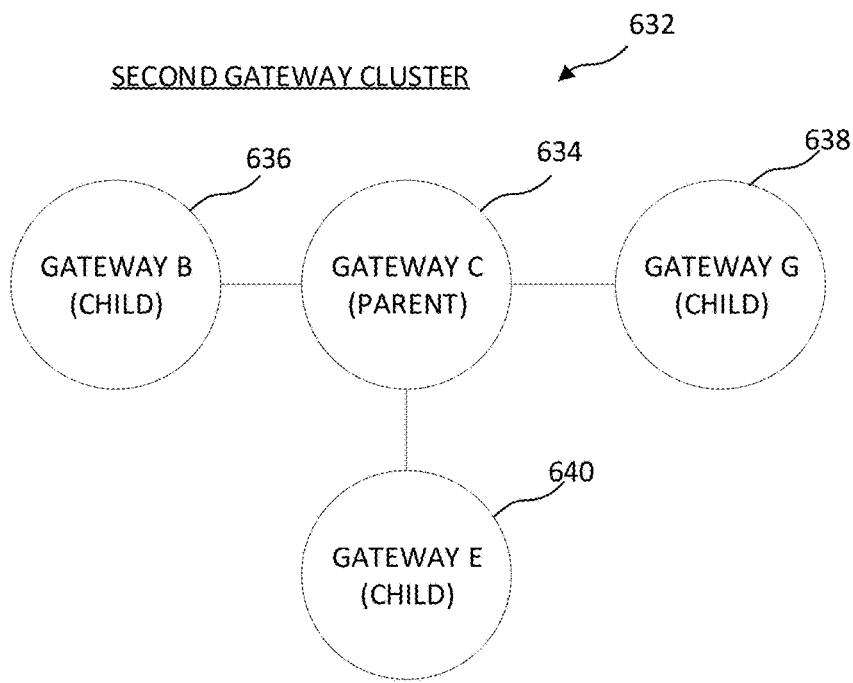
Figures 6F, 6G:
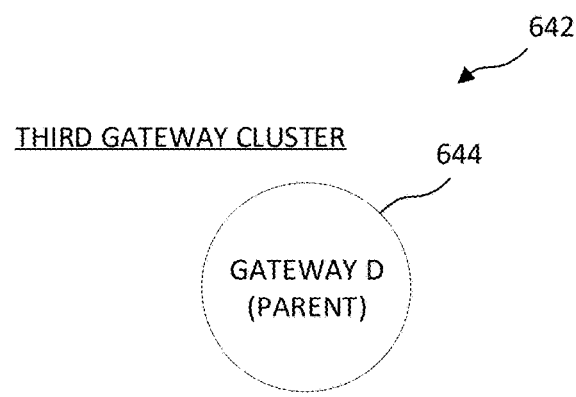

FIG. 6E illustrates an example second gateway cluster 632 that may be formed with the gateway C as the first gateway. The gateway C may have the greatest number of detected numbers than any other gateways of the set of gateways 630. The gateways B, G, and E may be determined as member gateways 636, 638, 640 of the second gateway cluster 632 as the gateways B, G, E may also detect the gateway C, and the gateway C may detect the gateways B, G, E more times than any other gateways in the set of gateways 630. After forming the second gateway cluster 632, the set of gateways 630 in FIG. 6D may be reduced to a set 640 comprising only the gateway D. FIG. 6G illustrates an example third gateway cluster 642 that may be formed with only the remaining gateway D 644 left in the set 640. Therefore, three gateway clusters, such as the first gateway cluster 622 (comprising the gateways A, F, J), the second gateway cluster 632 (comprising the gateways B, C, E, G), and the third gateway cluster 642 (comprising only the gateway D), may be formed from the set of gateways 620 that may be using the network channel ALPHA for communications. At step 454, if it is determined that there are no more gateways left in the set of gateways, the process proceeds to step 456.

Figure 7A:
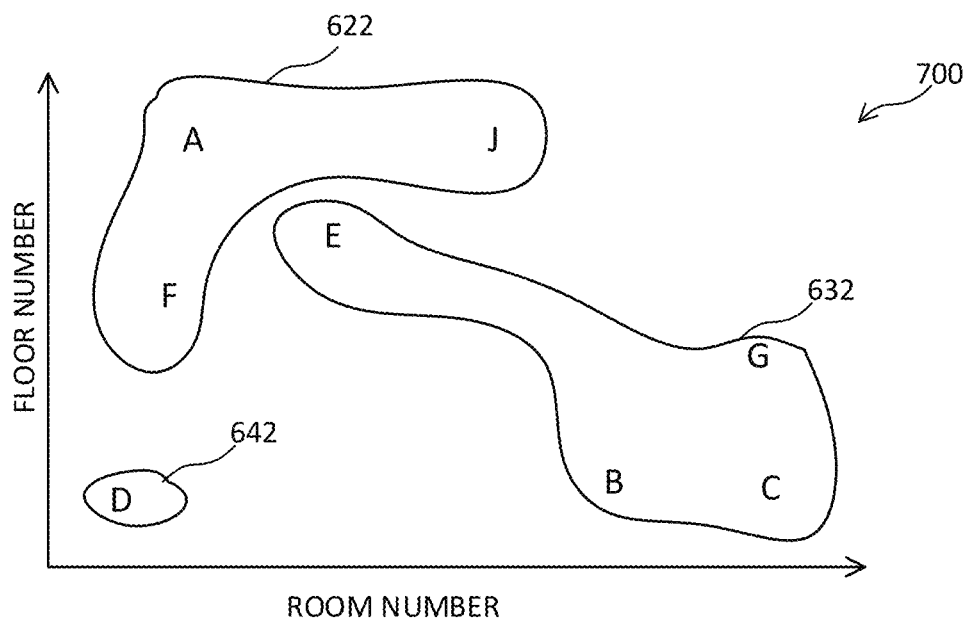
FIGS. 7A and 7B illustrate an example adjusting of a group of gateways based on the locations of the gateways.
Figure 7B:
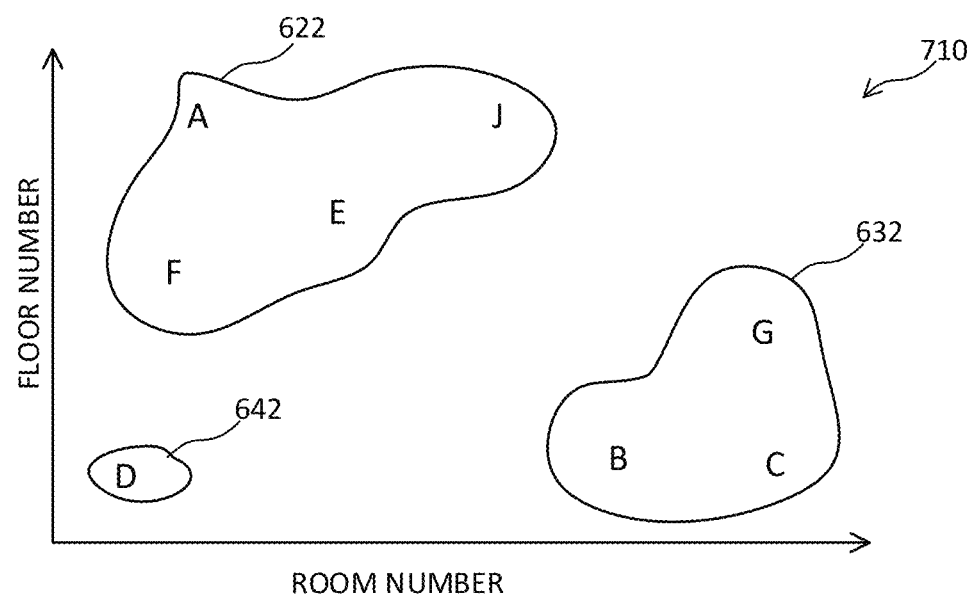

At step 456, the associations made between gateways in a cluster may be adjusted (e.g., cluster members may be added or removed) based on the physical locations of the gateways. For example, if a gateway of one of the gateway clusters is determined to be more than a threshold distance away from any of the other gateways in the cluster (e.g., more than a maximum wireless range of 1000 feet), that particular gateway may be removed from that cluster and added to another cluster with gateways that are close to the particular gateway. The greater the distance between the far away gateway and other gateways in the cluster, there may be a higher chance that the far away gateway may fail to be a suitable backup for the other gateways in the cluster as there may be an increased chance that a source of interference is placed between the faraway cluster and the other gateways. For example, the gateways A-T in FIG. 5 may be located in a multi-story building, and FIG. 7A illustrates an example mapping of the gateways in the first gateway cluster 622 (comprising the gateways A, F, J), the second gateway cluster 632 (comprising the gateways B, C, E, G), and the third gateway cluster 642 (comprising only the gateway D) in different floors and rooms of the building. The gateway E may be further away from the rest of the gateways B, C, G of the second gateway cluster 632, and closer to the gateways A, F, J in the first gateway cluster 622. If the distances between the gateway E and the other gateways B, C, G of the second gateway cluster 632 are more than a threshold distance, then gateway E may be moved from the second gateway cluster 632 to the first gateway cluster 622, as illustrated in FIG. 7B. The removal of the gateway E from the second cluster group 632 and the addition of the gateway E to the first gateway cluster 622 may be based on the gateways and A and E being able to detect each other, as shown in FIG. 6B. A virtual model of the area comprising the gateway clusters, such as the ones illustrated in FIGS. 7A and 7B, may be generated (e.g., by the gateway management system 302) based on the positional coordinates of the gateways in the area.

At step 458, in addition to or instead of step 456, the associations made between gateways in a cluster may be adjusted (e.g., cluster members may be added or removed) based on network usage and performance metrics of the gateways at different locations of the area. The network usage and performance metrics may be received from step 422 while scanning the wireless environment of the gateways. For example, the network usage and performance metrics received at step 422 may indicate that there is high contention level, bandwidth requirements, RF signal usage patterns, network failure rates (e.g., BER, FER, PER, etc.), SIR, and/or rate of packet jitters, and/or low quality of service (QoS) at an area location where most or all of the first gateway cluster 622 may be located. Therefore, the gateway E may be moved from the second gateway cluster 632 to the first gateway cluster 622 to provide more network resources at or near the location of the first gateway cluster 622.

At step 460, information about the associations between the members of the formed gateway clusters (e.g., the first gateway cluster 622, the second gateway cluster 632, and the third gateway cluster 642) may be sent to the gateways (e.g., gateways A, B, C, D, E, F, G). Additionally, the information may comprise instructions for the gateways to operate based on the formed associations and/or gateway clusters. For example, the instructions may instruct the gateways A, F, J that if one of the gateways A, F, J in the first gateway cluster 622 fails to operate adequately or becomes inoperative, the workload of the affected cluster may be reassigned to any of the backup gateways in the cluster.

At step 462, it may be determined whether there are more gateways available for clustering. For example, gateways associated with the selected network service provider of step 439 but using network channels other than the selected network channel of 439 may be available for clustering (e.g., gateways M, O, Q, S, T using the network channel BETA and associated with the network service provider I as shown in FIG. 5). Alternatively, or additionally, gateways associated with other network service providers than the selected network service provider of step 439 and using the selected network channel of 439 may be available for clustering (e.g., the gateways H, I, K, and I using the network channel ALPHA and associated with network service provider II as shown in FIG. 5). Moreover, gateways associated with other network service providers than the selected network service provider of step 439 and using a network channel other than the selected network channel of 439 may be available for clustering (e.g., gateways N, P, and R using the network channel BETA and associated with network service provider II as shown in FIG. 5). If there are more gateways available for clustering, the process may proceed to step 426 to choose another active network channel. Otherwise, the algorithm may proceed to step 414. The gateway clusters may be regrouped or go through another clustering process in the future based on future network design goals, operating preferences, contention level, radio signal strengths (RSSI) of the gateways, data throughput levels, changing network usage patterns or network traffic at different locations, addition or removal of gateways, change in the number of user devices and/or customer, and/or any change in the boundaries of the area.

Figure 8:
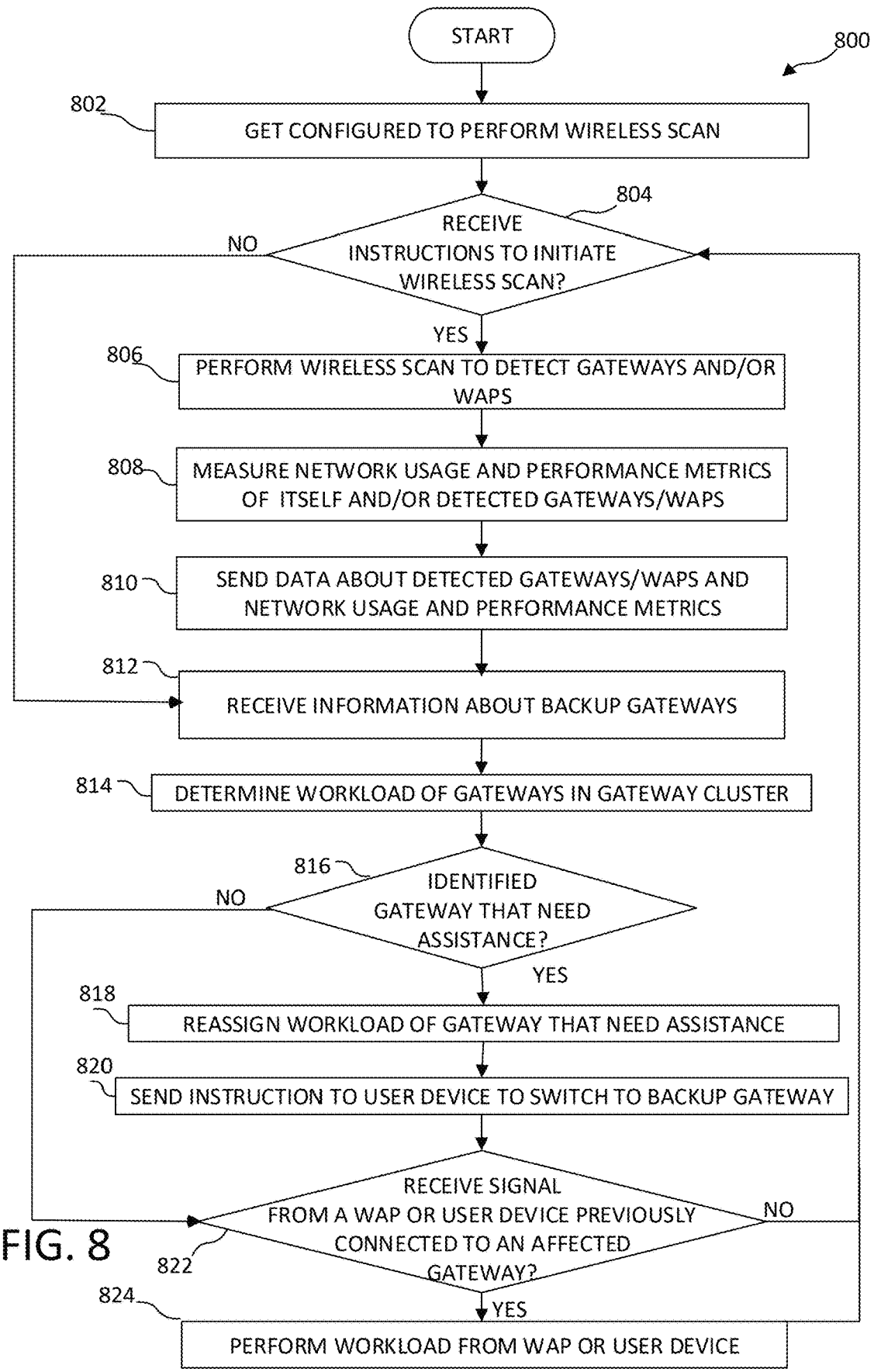
FIG. 8 illustrates an example algorithm for a gateway associated with backup gateways.

FIG. 8 shows an example process 800 of performing wireless scans, receiving information about backup gateways, and providing backup assistance to one or more gateways in a gateway cluster. The example steps of the process 800 in FIG. 8 may be performed a gateway (e.g., any one of the gateway 111, the gateways 312, 314, 316, 318, 320, the gateways A, B, C, D, E, F, G, J in FIGS. 6A-G, and/or any WAPs connected to the gateways), in different orders and with different, fewer, or additional steps than those illustrated. Multiple steps may also be combined.

At step 802, a gateway (e.g., any one of the gateway 111, the gateways 312, 314, 316, 318, 320, the gateways A, B, C, D, E, F, G, J in FIGS. 6A-G) may get configured to perform wireless scans. Furthermore, some or any of the WAPs connected to the gateway may also get configured to perform wireless scans. The gateway and/or WAPs being serviced or connected to the gateway may comprise circuitry (e.g., transmitter/receiver circuitry, wireless controller circuitry, and/or other circuitry) that may be capable of listening for signals (e.g., BEACONS, wireless signals, RF signals) or detecting signals from other gateways and/or WAPs in their wireless ranges. Getting configured to perform wireless scans may comprise receiving software modules and/or APIs from a gateway management server (e.g., the gateway management device 302, the gateway management server 122 hosting the gateway management system 132, the mobile devices 125 hosting the gateway management system 132, or any device in the environment 310 that may host a gateway management system) and installing the received software modules and/or APIs. The software modules and/or APIs may comprise instructions that cause the gateway and/or the WAPs to use the circuitries to detect the signals from other devices (e.g., detect wireless signals, BEACONS from other gateways and/or other WAPs). The software modules and/or APIs may also comprise instructions for measuring the gateway or WAP's network usage and/or performance metrics. Additionally, the software modules and/or APIs may also comprise instructions for measuring network usage and/or performance metrics of the detected devices. The software modules and/or APIs may comprise instructions to send reports of the detected devices and measured network usage and/or performance metrics to the gateway management system.

At step 804, it may be determined whether instructions were received to initiate a wireless scan. Instructions to initiate and perform a wireless scan may be received from a gateway management system (e.g., the gateway management device 302, the gateway management server 122 hosting the gateway management system 132, the mobile devices 125 hosting the gateway management system 132, or any device in the environment 310 that may host a gateway management system). Alternatively, a schedule may be received from the gateway management system, which may indicate when wireless scans may be initiated. For example, the schedule may specify initiating wireless scans every hour, every two hours, every week, etc. New schedules may be received from the gateway management system periodically. If instructions for initiating a wireless scan have been received and/or a schedule from the gateway management system indicates that it is time to initiate a wireless scan, the process proceeds to step 806. Otherwise, the process proceeds to step 812.

If instructions to initiate a wireless scan have been received at step 804, at step 806, a wireless scan may be performed by listening for signals (e.g., BEACONS, wireless signals, RF signals, etc.) broadcasted by nearby devices (e.g., nearby gateways and/or WAPs) and detecting such signals. A gateway may be detected if signals from the gateway and/or any WAPs connected to the gateway are detected. Various devices (e.g., gateways and/or WAPs) may be present in the wireless range of a gateway that can broadcast signals generally and/or while performing wireless scans. However, a gateway may not be able to detect signals from some of these devices because of interferences or obstacles present between the gateway and these devices.

Signals (e.g., BEACONS, wireless signals, RF signals, etc.) may also be broadcast for nearby devices (e.g., gateways and WAPs in the wireless range) performing wireless scans. The broadcasting signals from a gateway may comprise an identifier for the gateway (e.g., any unique identifier, an IP address, a MAC address, etc.), information about a network channel and/or a frequency band used by the gateway to broadcast the signals, an identifier for a gateway cluster the gateway may belong to, an SSID of a network provided by the gateway, communication protocols or standards being used by the gateway, and/or other data. Instructions may also be sent to WAPs being serviced by a gateway to perform their own wireless scans and/or report devices detected by the WAPs to the gateway or the gateway management system. Alternatively, the WAPs may get instructions from the gateway management system to perform wireless scans and report the devices detected by the WAPs to the gateway management system.

At step 808, network usage metrics and/or performance metrics of gateways and WAPs detected at step 806 may be measured. The network usage and/or performance metrics may comprise workload of the detected gateways and/or WAPs, RSSI, throughput, contention level, bandwidth used, bandwidth requirements, RF signal usage patterns, BER, packet error ratios PER, FER, SNR, SIR, packet jitter, QoS, packet error rate, packet latency, and/or other similar data of the detected gateways and/or WAPs. Additionally, or alternatively, a gateway may send a request to the nearby or detected devices to measure their network usage metrics and/or performance metrics and report the metrics back to the gateway.

At step 810, data indicating the successfully detected nearby gateways and/or WAPs and network usages and/or performance metrics of a gateway may be sent to the gateway management system. The data may be used later by the gateway management system to associate the gateway with one or more suitable backup gateways. The gateways and/or WAPs connected to the gateways may also store the data to identify any nearby gateways performing poorly.

At step 812, information may be received about gateway associations (e.g., clusters or groups) formed by a gateway management system managing gateways. The information may comprise information about one or more backup gateways that have been associated as backup gateways for the gateway. Alternatively, or additionally, the information received at step 812 may comprise information about a cluster that a gateway has been assigned to (e.g., the gateway A in FIG. 6C may receive information about the first gateway cluster 622 comprising the gateways A, F, and J), other gateways included in that cluster (e.g., the gateways A, F, and J), and/or WAPs connected to or being serviced by the other gateways. The information may also comprise additional information about the other gateways in the cluster (e.g., IP address, MAC address, physical coordinates, serial number, network channel and/or frequency band used, communications protocols, SSID, etc.), and/or additional information about WAPs connected to the cluster (e.g., IP address, MAC address, physical coordinates, SSID, BSSID, serial number, network channel and/or frequency band used, communications protocols, and/or other similar data of the WAPs). Additionally, the information may comprise information about other nearby gateway clusters (e.g., the gateway A in FIG. 6C may receive information about the second gateway cluster 632 comprising the gateways B, C, E, and G, and the third gateway cluster 642 comprising only the gateway D). Gateways in a gateway cluster may store the information received at step 812 and use the information to coordinate its operation with operations of other gateways in its cluster. Additionally, the gateway may forward the information to some of the WAPs being serviced by the gateway and instruct the WAPs to store the information and use that information in events the gateway becomes inoperable or has poor network performance.

In addition, the information received at step 812 may indicate a parent gateway for each or some of the clusters (e.g., gateway A is the parent gateway of the first cluster 622, gateway C is the parent gateway of the second gateway cluster 632, and gateway D is the parent gateway of the third cluster 642). The information may further indicate the child gateways for each or some of the clusters (e.g., gateways F and J are child gateways of the first gateway cluster 622, gateways B, G, and E are child gateways of the second gateway cluster 632, and the third gateway cluster 642 has no child gateways).

Gateways that have been designated as parent gateways in the information received at step 812 (e.g., information that gateway A is the parent gateway of the first cluster 622, gateway C is the parent gateway of the second gateway cluster 632, and gateway D is the parent gateway of the third cluster 642) may be configured to operate as a parent gateway of gateway clusters indicated in the information. For example, the gateway A can be configured to act as a parent gateway of a gateway cluster comprising the gateways A, F, and J. Configuring a gateway as a parent gateway of a gateway cluster may comprise installing, downloading, or modifying software modules and/or APIs of the parent gateway, where the software modules and/or APIs comprise instructions for the parent gateway to monitor network usage, performance characteristics, and/or workloads of itself and the child gateways of the cluster, determine that the child gateways are active, and/or reassign workload from one gateway of the cluster to another. The software modules and/or APIs may comprise instructions for the parent gateway to send reports about the network usage, performance characteristics, and/or workloads of itself and the child gateways of the cluster to a gateway management device (e.g., the gateway management device 302, the gateway management server 122 hosting the gateway management system 132 hosted by the gateway management server 122, the mobile devices 125 hosting the gateway management system 132, or any device in the environment 310 hosting a gateway management system) managing the operation of the parent gateway and the child gateways of that gateway cluster. Gateways that have been designated as child gateways in the information received at step 490 (e.g., information that gateways F and J are the child gateways of the first cluster 622, gateways B, G, and E are the child gateways of the second gateway cluster 632) may be configured to operate as child gateways of gateway clusters indicated in the information. For example, the gateways F and J may be configured to act as child gateways of the parent gateway A of a gateway cluster comprising the gateways A, F, and J. Configuring a gateway as a child gateway of a gateway cluster may comprise installing, downloading, or modifying software modules and/or APIs of the parent gateway, where the software modules and/or APIs may comprise instructions for the child gateway to monitor network usage, performance characteristics, and/or workloads of itself and report data from the monitoring to the parent gateway of the cluster, report to the parent gateway that the child gateway has excessive workload, and/or receive instructions from the patent gateway for reassigned workload from another gateway.

At step 814, workloads of different gateways in a cluster may be determined. For example, a gateway of a gateway cluster (e.g., the parent gateway A of a gateway cluster comprising the gateways A, F, and J, or any gateway in the cluster) may determine workloads of itself (e.g., the gateway A) and the other gateways of the cluster (e.g., the gateways A, F, and J) or any gateways that has been determined to be backup gateways of the gateway. For example, a gateway may request the other gateways in the cluster and/or identified backup gateways to report their workload to the gateway. The gateway may also determine whether all the gateways in its cluster or its identified backup gateways are active or any one of them has become inoperable by sending signals (e.g., pinging or sending other data signals) to the other gateways in its cluster or identified backup gateways.

At step 816, a gateway in need of assistance may be identified. For example, a gateway may determine another gateway that needs assistance, is unresponsive, inoperable, or has excess workload. The gateway may identify another unresponsive or inoperable gateway by sending signals (e.g., pinging or sending other data signals) to the unresponsive or inoperable gateway and not hearing back. Additionally, or alternatively, a gateway may receive messages from one or more gateways reporting that they have excess workload. A gateway may also analyze the data collected at step 814 to identify affected gateways in the cluster or backup gateways with poor performance metrics and/or excessive workloads. In addition, one or more child gateways of the cluster may determine that the parent gateway has become inoperative or unresponsive and may send a request to the gateway management device managing the operation of the gateway cluster to assign a new parent gateway. If a gateway that needs assistance is identified at step 816, the process may proceed to step 818. Otherwise, the process may proceed to step 820.

If a gateway in need of assistance is identified at step 816, at step 818, some of the workload of the affected gateway may be reassigned to other gateways. For example, the affected gateway may forward some of the affected gateway's data communications from one or some of the WAPs connected to the affected gateway to a backup gateway selected by the parent gateway in the cluster. A gateway with low workload and/or satisfactory metrics in the cluster may be selected as a backup gateway. Additionally, or alternatively, instructions may be sent to one or some of the WAPs connected to or being serviced by the affected gateway to forward data communications from those WAPs to the selected backup gateway. Alternatively, if a WAP determines that the gateway it is connected to has become inoperable, the WAP may use the information received at step 812 to find a backup gateway and forward all of its data communications to the backup gateway. Or the WAP may request for selection of a new backup gateway for the WAP. Alternatively, or additionally, if a gateway in need of assistance is identified at step 816, then at step 820, user devices being serviced by the affected gateway may be sent instructions to switch to a backup gateway or WAPs connected to the backup gateway. The instructions to the user devices may comprise unique identifiers of the backup gateway or the WAPS connected to the backway gateway, such as basic service set identifiers (BSSID), a media access control address (MAC address), one or more of an IP Address, serial number, etc.

At step 822, a gateway may determine whether it has received any signals from a WAP or a user device that is not able to be serviced by an affected gateway. If a signal from a WAP or a user device is not received, the process proceeds to step 804. Otherwise, a received signal from a WAP or a user device may request the gateway to handle the data communications of the WAP or the user device. At step 824, if a WAP has sent the request at step 822, the gateway may accept the WAP's request and process all data communications from user devices wireless connected to the WAP. The acceptance of the gateway may be based on the gateway determining that the WAP was originally connected to another gateway in its cluster from the information received at step 812. After the gateway accepts the WAP's request, the process may proceed to step 804. If a user device has sent the request at step 822, the gateway may accept the user device's request and process all data communications from the user device. The acceptance of the gateway may be based on the gateway determining that the user device was originally connected to another gateway in its cluster from the information received at step 812. After the gateway accepts the user device's request, the process may proceed to step 804.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An apparatus comprising:
one or more processors; and
memory storing instructions that, when executed by the one or more processors, cause the apparatus to:
receive data indicating a quantity of times that a first gateway device has detected a second gateway device;
associate, based on the data, the second gateway device as a backup of the first gateway device;
determine that the first gateway device needs backup assistance; and
cause, based on the associating, the second gateway device to provide the backup assistance to the first gateway device.

2. The apparatus of claim 1, wherein the data indicates the quantity of times the first gateway device detected, directly or via a wireless access point connected to the first gateway device, the second gateway device.

3. The apparatus of claim 1, wherein the instructions, when executed by the one or more processors, further cause the apparatus to:
select, from a plurality of gateway devices, the first gateway device based on the first gateway device detecting a maximum quantity of gateway devices from the plurality of gateway devices.

4. The apparatus of claim 1, wherein the instructions, when executed by the one or more processors, cause the apparatus to associate the second gateway device as the backup of the first gateway device by:
determining that the second gateway device can detect, directly or via a wireless access point connected to the second gateway device, signals from the first gateway device.

5. The apparatus of claim 1, wherein the instructions, when executed by the one or more processors, cause the apparatus to associate the second gateway device as the backup of the first gateway device further based on one or more of:
a physical location of the first gateway device;
a physical location of the second gateway device;
a bandwidth requirement of the first gateway device;
a bandwidth requirement of the second gateway device;
a network failure rate associated with the first gateway device; or
a network failure rate associated with the second gateway device.

6. The apparatus of claim 1, wherein the instructions, when executed by the one or more processors, cause the apparatus to associate the second gateway device as the backup of the first gateway device by:
associating, based on a determination that the first gateway device and the second gateway device are associated with a same network service provider, the second gateway device as the backup of the first gateway device.

7. The apparatus of claim 1, wherein the instructions, when executed by the one or more processors, cause the apparatus to determine that the first gateway device needs the backup assistance by determining that the first gateway device is inoperable or a workload of the first gateway device satisfies a threshold, and
wherein the instructions, when executed by the one or more processors, cause the apparatus to cause the second gateway device to provide the backup assistance to the first gateway device by causing a portion of the workload of the first gateway device to be assigned to the second gateway device.

8. The apparatus of claim 1, wherein the instructions, when executed by the one or more processors, cause the apparatus to associate the second gateway device as the backup of the first gateway device further by:
associating, based on a determination that the first gateway device and the second gateway device are associated with a same network channel, the second gateway device as the backup of the first gateway device.

9. A non-transitory computer-readable medium storing instructions that, when executed, cause:
receiving data indicating a quantity of times that a first gateway device has detected a second gateway device;
associating, based on the data, the second gateway device as a backup of the first gateway device;
determining that the first gateway device needs backup assistance; and
causing, based on the associating, the second gateway device to provide the backup assistance to the first gateway device.

10. The non-transitory computer-readable medium of claim 9, wherein the data indicates the quantity of times the first gateway device detected, directly or via a wireless access point connected to the first gateway device, the second gateway device.

11. The non-transitory computer-readable medium of claim 9, wherein the instructions, when executed, further cause:
selecting, from a plurality of gateway devices, the first gateway device based on the first gateway device detecting a maximum quantity of gateway devices from the plurality of gateway devices.

12. The non-transitory computer-readable medium of claim 9, wherein the instructions, when executed, cause associating the second gateway device as the backup of the first gateway device by:

determining that the second gateway device can detect, directly or via a wireless access point connected to the second gateway device, signals from the first gateway device.

13. The non-transitory computer-readable medium of claim 9, wherein the instructions, when executed, cause associating the second gateway device as the backup of the first gateway device further based on one or more of:
a physical location of the first gateway device;
a physical location of the second gateway device;
a bandwidth requirement of the first gateway device;
a bandwidth requirement of the second gateway device;
a network failure rate associated with the first gateway device; or
a network failure rate associated with the second gateway device.

14. The non-transitory computer-readable medium of claim 9, wherein the instructions, when executed, cause associating the second gateway device as the backup of the first gateway device by:
associating, based on a determination that the first gateway device and the second gateway device are associated with a same network service provider, the second gateway device as the backup of the first gateway device.

15. The non-transitory computer-readable medium of claim 9, wherein the instructions, when executed, cause determining that the first gateway device needs the backup assistance by determining that the first gateway device is inoperable or a workload of the first gateway device satisfies a threshold, and
wherein the instructions, when executed, cause the second gateway device to provide the backup assistance to the first gateway device by causing a portion of the workload of the first gateway device to be assigned to the second gateway device.

16. The non-transitory computer-readable medium of claim 9, wherein the instructions, when executed, cause associating the second gateway device as the backup of the first gateway device further by:
associating, based on a determination that the first gateway device and the second gateway device are associated with a same network channel, the second gateway device as the backup of the first gateway device.

17. A system comprising:
a computing device; and
a first gateway device;
wherein the computing device comprises:
one or more processors; and
memory storing instructions that, when executed by the one or more processors, cause the computing device to:
receive data indicating a quantity of times that the first gateway device has detected a second gateway device;
associate, based on the data, the second gateway device as a backup of the first gateway device;
determine that the first gateway device needs backup assistance; and
cause, based on the associating, the second gateway device to provide the backup assistance to the first gateway device, and
wherein the first gateway device is configured to send the data.

18. The system of claim 17, wherein the data indicates the quantity of times the first gateway device detected, directly or via a wireless access point connected to the first gateway device, the second gateway device.

19. The system of claim 17, wherein the instructions, when executed by the one or more processors, further cause the computing device to:
select, from a plurality of gateway devices, the first gateway device based on the first gateway device detecting a maximum quantity of gateway devices from the plurality of gateway devices.

20. The system of claim 17, wherein the instructions, when executed by the one or more processors, cause the computing device to associate the second gateway device as the backup of the first gateway device by:
determining that the second gateway device can detect, directly or via a wireless access point connected to the second gateway device, signals from the first gateway device.

21. The system of claim 17, wherein the instructions, when executed by the one or more processors, cause the computing device to associate the second gateway device as the backup of the first gateway device further based on one or more of:
a physical location of the first gateway device;
a physical location of the second gateway device;
a bandwidth requirement of the first gateway device;
a bandwidth requirement of the second gateway device;
a network failure rate associated with the first gateway device; or
a network failure rate associated with the second gateway device.

22. The system of claim 17, wherein the instructions, when executed by the one or more processors, cause the computing device to associate the second gateway device as the backup of the first gateway device by:
associating, based on a determination that the first gateway device and the second gateway device are associated with a same network service provider, the second gateway device as the backup of the first gateway device.

23. The system of claim 17, wherein the instructions, when executed by the one or more processors, cause the computing device to determine that the first gateway device needs the backup assistance by determining that the first gateway device is inoperable or a workload of the first gateway device satisfies a threshold, and
wherein the instructions, when executed by the one or more processors, cause the computing device to cause the second gateway device to provide the backup assistance to the first gateway device by causing a portion of the workload of the first gateway device to be assigned to the second gateway device.

24. The system of claim 17, wherein the instructions, when executed by the one or more processors, cause the computing device to associate the second gateway device as the backup of the first gateway device further by:
associating, based on a determination that the first gateway device and the second gateway device are associated with a same network channel, the second gateway device as the backup of the first gateway device.

25. An apparatus comprising:
one or more processors; and
memory storing instructions that, when executed by the one or more processors, cause the apparatus to:
receive, for a first gateway device, data indicating:
a quantity of times the first gateway device has detected each of a plurality of second gateway devices; and whether second gateway devices, of the plurality of second gateway devices, can detect the first gateway device;

associate, based on the data, at least one second gateway device, of the plurality of second gateway devices, as a backup of the first gateway device; and send, to the first gateway device and the at least one second gateway device, a message configured to cause the at least one second gateway device to provide backup assistance to the first gateway device.

26. The apparatus of claim 25, wherein the instructions, when executed by the one or more processors, cause the apparatus to associate the at least one second gateway device as the backup of the first gateway device by:
selecting the at least one second gateway device based on determining that the at least one second gateway device can detect the first gateway device.

27. The apparatus of claim 25, wherein the instructions, when executed by the one or more processors, further cause the apparatus to:
prior to associating the at least one second gateway device as the backup of the first gateway device:
select the first gateway device based on a determination that the first gateway device detects a maximum quantity of gateway devices.

28. The apparatus of claim 25, wherein the data indicating the quantity of times comprises data indicating a quantity of times the first gateway device, directly or via a wireless access point connected to the first gateway device, has detected signals from each of the plurality of second gateway devices.

29. The apparatus of claim 25, wherein the instructions, when executed by the one or more processors, cause the apparatus to associate the at least one second gateway device as the backup of the first gateway device further based on one or more of:
a physical location of the first gateway device;
a physical location of the at least one second gateway device;
a bandwidth requirement of the first gateway device;
a bandwidth requirement of the at least one second gateway device;
a network failure rate associated with the first gateway device; or
a network failure rate associated with the at least one second gateway device.

30. The apparatus of claim 25, wherein the instructions, when executed by the one or more processors, cause the apparatus to cause the at least one second gateway device to provide backup assistance to the first gateway device by:
determining that the first gateway device is inoperable or has a workload that satisfies a threshold; and
causing a portion of the workload of the first gateway device to be assigned to the at least one second gateway device.

31. The apparatus of claim 25, wherein the instructions, when executed by the one or more processors, cause the apparatus to associate the at least one second gateway device as the backup of the first gateway device further by:
determining that the first gateway device and the at least one second gateway device are associated with a same network channel.

32. A non-transitory computer-readable medium storing instructions that, when executed, cause:
receiving, for a first gateway device, data indicating:
a quantity of times the first gateway device has detected each of a plurality of second gateway devices; and
whether second gateway devices, of the plurality of second gateway devices, can detect the first gateway device;

associating, based on the data, at least one second gateway device, of the plurality of second gateway devices, as a backup of the first gateway device; and sending, to the first gateway device and the at least one second gateway device, a message configured to cause the at least one second gateway device to provide backup assistance to the first gateway device.

33. The non-transitory computer-readable medium of claim 32, wherein the instructions, when executed, cause associating the at least one second gateway device as the backup of the first gateway device by causing:
selecting the at least one second gateway device based on determining that the at least one second gateway device can detect the first gateway device.

34. The non-transitory computer-readable medium of claim 32, wherein the instructions, when executed, further cause:
prior to the associating the at least one second gateway device as the backup of the first gateway device:
selecting the first gateway device based on a determination that the first gateway device detects a maximum quantity of gateway devices.

35. The non-transitory computer-readable medium of claim 32, wherein the data indicating the quantity of times comprises data indicating a quantity of times the first gateway device, directly or via a wireless access point connected to the first gateway device, has detected signals from each of the plurality of second gateway devices.

36. The non-transitory computer-readable medium of claim 32, wherein the instructions, when executed, cause associating the at least one second gateway device as the backup of the first gateway device further based on one or more of:
a physical location of the first gateway device;
a physical location of the at least one second gateway device;
a bandwidth requirement of the first gateway device;
a bandwidth requirement of the at least one second gateway device;
a network failure rate associated with the first gateway device; or
a network failure rate associated with the at least one second gateway device.

37. The non-transitory computer-readable medium of claim 32, wherein the instructions, when executed, cause the at least one second gateway device to provide backup assistance to the first gateway device by causing:
determining that the first gateway device is inoperable or has a workload that satisfies a threshold; and
causing a portion of the workload of the first gateway device to be assigned to the at least one second gateway device.

38. The non-transitory computer-readable medium of claim 32, wherein the instructions, when executed, cause associating the at least one second gateway device as the backup of the first gateway device by causing:
determining that the first gateway device and the at least one second gateway device are associated with a same network channel.

39. A system comprising:
a computing device; and
a first gateway device;
wherein the computing device comprises:
one or more processors; and memory storing instructions that, when executed by the one or more processors, cause the computing device to:
receive, for a first gateway device, data indicating:
a quantity of times the first gateway device has detected each of a plurality of second gateway devices; and
whether second gateway devices, of the plurality of second gateway devices, can detect the first gateway device;
associate, based on the data, at least one second gateway device, of the plurality of second gateway devices, as a backup of the first gateway device; and
send, to the first gateway device and the at least one second gateway device, a message configured to cause the at least one second gateway device to provide backup assistance to the first gateway device.

40. The system of claim 39, wherein the instructions, when executed by the one or more processors, cause the computing device to associate the at least one second gateway device as the backup of the first gateway device by:
selecting the at least one second gateway device based on determining that the at least one second gateway device can detect the first gateway device.

41. The system of claim 39, wherein the instructions, when executed by the one or more processors, further cause the computing device to:
prior to associating the at least one second gateway device as the backup of the first gateway device:
select the first gateway device based on a determination that the first gateway device detects a maximum quantity of gateway devices.

42. The system of claim 39, wherein the data indicating the quantity of times comprises data indicating a quantity of times the first gateway device, directly or via a wireless access point connected to the first gateway device, has detected signals from each of the plurality of second gateway devices.

43. The system of claim 39, wherein the instructions, when executed by the one or more processors, cause the computing device to associate the at least one second gateway device as the backup of the first gateway device further based on one or more of:
a physical location of the first gateway device;
a physical location of the at least one second gateway device;
a bandwidth requirement of the first gateway device;
a bandwidth requirement of the at least one second gateway device;
a network failure rate associated with the first gateway device; or
a network failure rate associated with the at least one second gateway device.

44. The system of claim 39, wherein the instructions, when executed by the one or more processors, cause the computing device to cause the at least one second gateway device to provide backup assistance to the first gateway device by:
determining that the first gateway device is inoperable or has a workload that satisfies a threshold; and
causing a portion of the workload of the first gateway device to be assigned to the at least one second gateway device.

45. The system of claim 39, wherein the instructions, when executed by the one or more processors, cause the computing device to associate the at least one second gateway device as the backup of the first gateway device further by:
determining that the first gateway device and the at least one second gateway device are associated with a same network channel.

* * * * *